United States Patent [19]
Shiomi et al.

[11] Patent Number: 5,365,150
[45] Date of Patent: Nov. 15, 1994

[54] INVERTER DEVICE HAVING LOAD VOLTAGE DETECTION FUNCTION

[75] Inventors: Tsutomu Shiomi; Hiroichi Shinbori, both of Kadoma, Japan

[73] Assignee: Matsushita Electric Works, Ltd., Osaka, Japan

[21] Appl. No.: 9,042

[22] Filed: Jan. 26, 1993

[30] Foreign Application Priority Data

Jan. 28, 1992 [JP]  Japan .................................. 4-013463

[51] Int. Cl.$^5$ ............................................. H05B 37/02
[52] U.S. Cl. ................................. 315/209 R; 315/307; 315/DIG. 5; 315/DIG. 7
[58] Field of Search ..................... 315/209 R, 208, 224, 315/244, 291, 307, DIG. 5, DIG. 7

[56] References Cited

U.S. PATENT DOCUMENTS

| 4,170,747 | 10/1979 | Holmes | 315/307 |
| 4,373,146 | 2/1983 | Bonazoli et al. | 315/209 R |
| 4,734,624 | 3/1988 | Nagase et al. | 315/DIG. 7 X |
| 5,166,579 | 11/1992 | Kawabata et al. | 315/209 R |

*Primary Examiner*—Robert J. Pascal
*Assistant Examiner*—Haissa Philogene
*Attorney, Agent, or Firm*—Leydig, Voit & Mayer

[57] ABSTRACT

An inverter device made detectable at a high speed and highly precisely a load voltage of all waves in one cycle, with an arrangement including a voltage detecting means having a capacitor and connected to a load which is connected through a switching means to a DC power source, means connected to the voltage detecting means for charging and discharging the capacitor, and means for maintaining, in a predetermined period in which a transient voltage upon every inversion of load voltage is generated, a capacitor voltage immediately before the predetermined period.

16 Claims, 25 Drawing Sheets

INVERTER DEVICE HAVING LOAD VOLTAGE DETECTION FUNCTION

BACKGROUND OF THE INVENTION

This invention relates to such inverter device that can be employed in a lamp lighting device, for example, for rendering a high pressure discharge (HID) lamp to be lighted with a square wave in a bridge inverter system.

DESCRIPTION OF RELATED ART

While there have been suggested various devices for lighting the HID lamp at a commercial power source frequency of 50 Hz or 60 Hz, there has been a problem that the device has been caused to be large in dimensions and also in weight due to the necessity of providing in the lighting device a choke coil, transformer, capacitor and so on as a measure for dealing with such low frequency.

In order to minimize in size and weight the lamp lighting device, on the other hand, there has been also employed a high frequency lighting system which can minimize required number of such parts as above which are apt to increase the size and weight of the system, but the system has involved a problem that a frequency range allowing a stable lighting is made narrower due to an acoustic resonance phenomenon specific to the HID lamp so that circuit designing has been made complicated. While in this case the stable lighting is attainable with a frequency higher than several 100 KHz employed for the lighting, there arise such other problems as switching loss, noise occurrence and so on.

In U.S. Pat. No. 4,734,624 to H. Nagase et al, on the other hand, there has been suggested an arrangement in which a voltage close in the frequency to that of the commercial source power is smoothed through a switching element which repeats ON and OFF operation at a high frequency and a square wave of a low frequency is thereby generated and applied to the discharge lamp. Here, the HID lamp shows a lighting characteristic that the lighting state varies with passage of time after its starting, and it is required to supply a proper power in accordance with the variation in the lighting state. In Japanese Patent Laid-Open Publication No. 2-172192, S. Kubota et al have disclosed an arrangement having means for detecting the lighting state of the lamp in view of the lamp voltage so that a proper power is supplied in accordance with the variation in the lamp lighting state for attaining a stable lighting. Even when an attempt is made to realize the stable lighting of the HID lamp with a combination of these known lamp lighting arrangements, however, there has arisen a problem that a lamp voltage detecting means employed in the foregoing Japanese Patent Laid-Open Publication No. 2-172192 is low in the speed of detecting the lamp voltage due to that the detection is realized by a capacitor coupling, and that the voltage can be detected only during half wave of each cycle.

In a further Japanese Patent Laid-Open Publication No. 4-322169 of H. Sinbori et al, there has been disclosed a lamp lighting device in which a low frequency square wave is applied to the discharge lamp and is capable of detecting the load voltage in all waves in each cycle. In executing the lighting control of the discharge lamp with the lamp voltage detected, however, the precision of control has not reached a sufficiently satisfiable level, and it has been demanded that the device is improved in the precision.

SUMMARY OF THE INVENTION

A primary object of the present invention is, therefore, to provide an inverter device capable of providing as an output a low frequency square wave, detecting also the load voltage in all waves in each cycle at a high speed and at a high precision, and remarkably improving the precision of control when employed in such control system as the discharge lamp lighting device.

According to the present invention, this object can be realized by means of an inverter device including a switching means connected to a DC power source for providing a square wave, a load section connected to the switching means and having at least a load and a first capacitor connected in parallel with the load, and means for detecting voltages of the load, wherein the voltage detecting means includes a second capacitor and means for comparing the detected voltage of the load with a voltage of the second capacitor, means for charging and discharging the second capacitor is connected to the voltage detecting means, and means is provided for maintaining, in a predetermined period in which at least a transient voltage upon every inversion of the load voltage is generated, the voltage of the second capacitor immediately before the predetermined period.

Other objects and advantages of the present invention shall be made clear in following description of the invention detailed with reference to embodiments shown in accompanying drawings.

The present invention shall be disclosed in the followings with reference to the respective preferred embodiments shown in the accompanying drawings, but it will be appreciated that the intention is not to limit the present invention only to the embodiment shown but rather to cover all alterations, modifications and equivalent arrangements possible within the scope of appended claims.

DETAILED DESCRIPTION OF THE PREFERRED EMBODIMENTS

Figure 1:
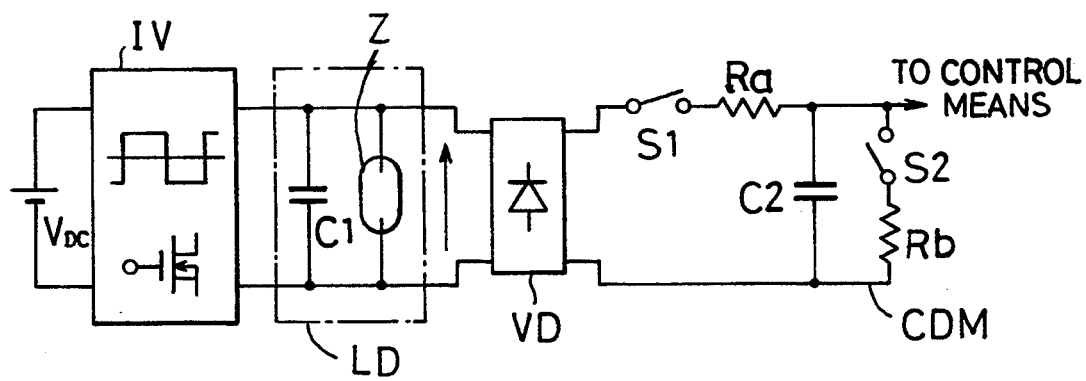
FIG. 1 is a circuit diagram showing a basic arrangement of the inverter device according to the present invention.

Referring here to FIG. 1 showing the basic arrangement of the inverter device according to the present invention, the inverter device according to the present invention connects to a DC power source $V_{DC}$ a load section L including a load Z and a first capacitor C1 connected in parallel to the load Z. To this load section L, there are connected on preceding side to be between the power source $V_{DC}$ and the load section L an inverter IV providing a square wave and on following side a voltage detecting means VD which including a second capacitor C2 connected to the means through a switch S1 and a resistor Ra, and a circuit CDM comprising a series circuit of a switch S2 and a resistor Rb for charging and discharging the second capacitor C2 is connected at following stage of the voltage detecting means VD. An output of this inverter device is provided to such proper device associated as a control circuit of a discharge lamp lighting device.

Figure 2:
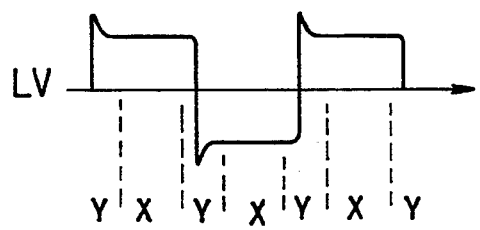
FIG. 2 is a waveform diagram showing the load voltage in the inverter device of FIG. 1.

For the detection of the load voltage, as shown in FIG. 2, it is general that such unusual voltage that involving a transient voltage at every inversion of applied voltage, that is, upon every polarity inversion of square wave, so as to be of a larger fluctuation than that in every period X in which the voltage is generated at an ordinary level, is to be detected. With the foregoing arrangement, on the other hand, the switches S1 and S2 are turned OFF during at least every inversion period Y to stop charging and discharging action of the second capacitor C2 so that a voltage of this second capacitor C2 immediately before an initiation of the period Y will be maintained.

Figure 3:
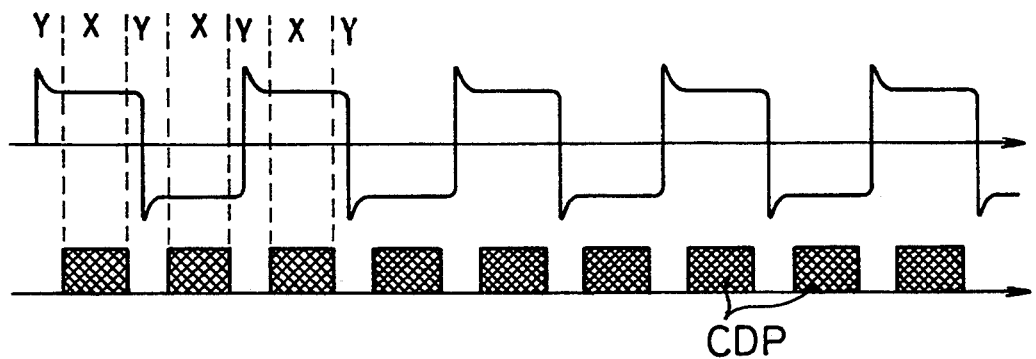
FIGS. 3 to 5 are waveform diagrams for explaining respectively different operating state of the inverter device of FIG. 1.
Figure 4:
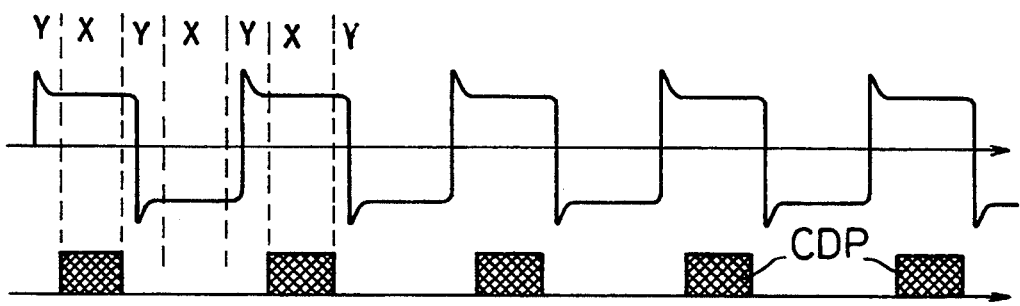
Figure 5:
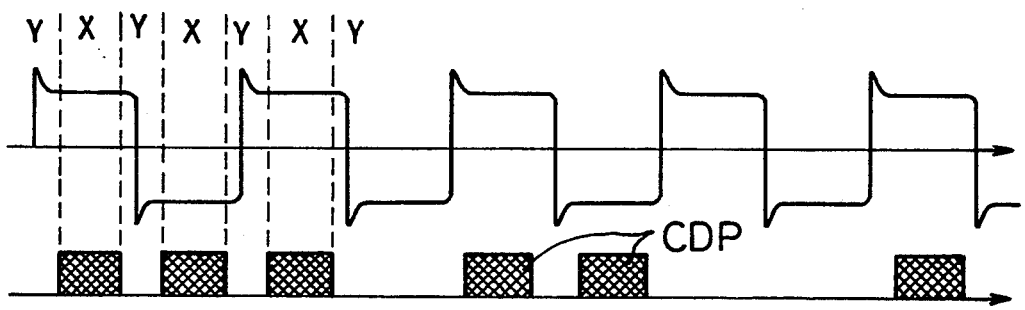

In this case, charge and discharge period CDP of the second capacitor C2 can be realized in such various cycles that appearing at every half wave in both polarities of the applied voltage as shown in FIG. 3, at every half wave in either one polarity of the applied voltage as in FIG. 4, or at any optional timing as shown in FIG. 5.

Figure 6:
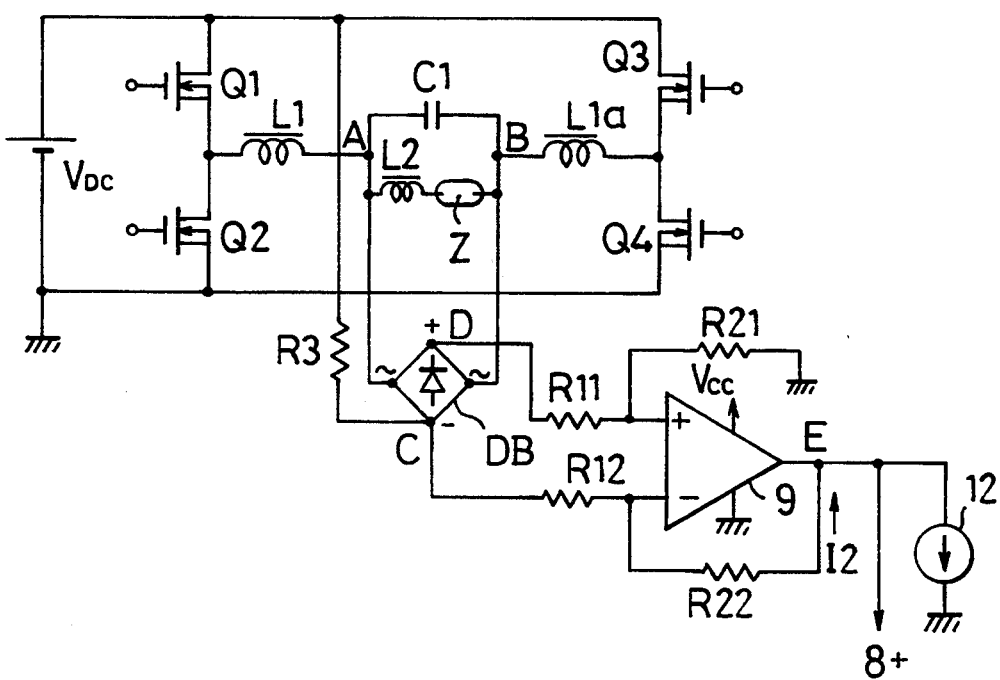
FIGS. 6 and 7 are circuit diagrams of different parts of a practical embodiment of the inverter device according to the present invert%ion.
Figure 7:
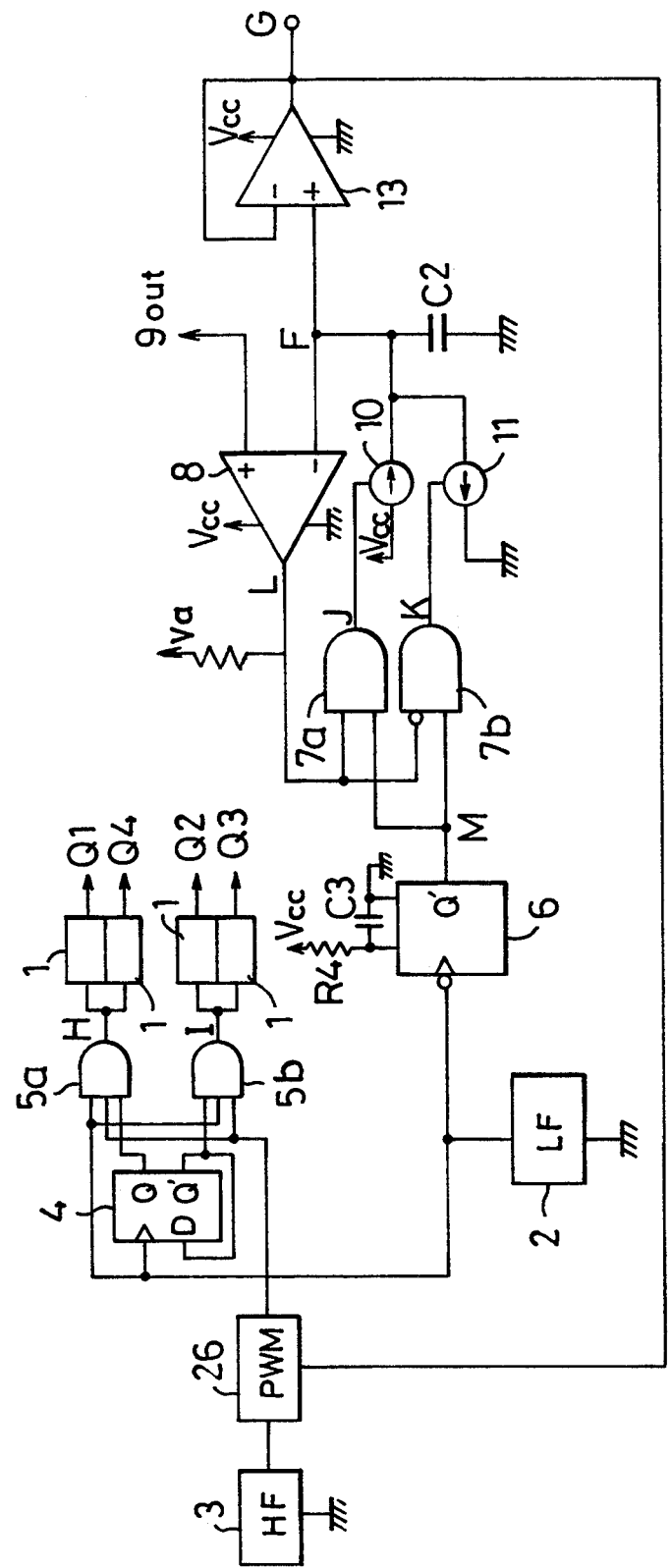

In FIGS. 6 and 7, there is shown a practical embodiment of the inverter device according to the present invention, in which FET driving circuits 1 are providing respectively a drive signal to each of switching elements Q1 to Q4 formed by a power MOSFET. A square wave frequency is oscillated by a low frequency oscillator 2, and a switching frequency is oscillated from a high frequency oscillator 3. A D-flip-flop 4 is connected at its inverse output terminal Q' to a data input terminal D of the flip-flop and at its clock input terminal to the low frequency oscillator 2 to receive an oscillation output thereof. With this D-flip-flop 4, the oscillation output of the low frequency oscillator 2 is frequency-divided.

Figure 8:
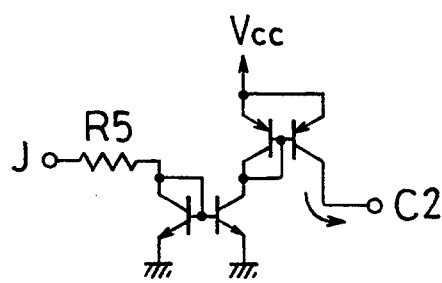
FIGS. 8 and 9 show in circuit diagrams different control type current source employable respectively in the embodiment of FIGS. 6 and 7.
Figure 9:
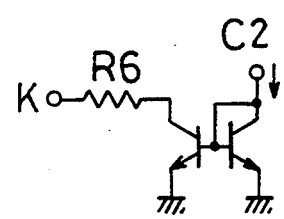
Figure 10:
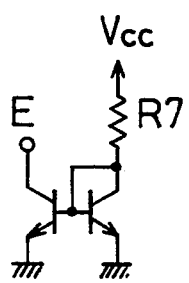
FIG. 10 shows in a circuit diagram a constant current source employable in the embodiment of FIGS. 6 and 7.

The oscillation output of the low frequency oscillator 2 is provided to a first input terminal of respective AND gates 5a and 5b, while a second input terminal thereof is connected to the high frequency oscillator 3 to receive its output, and a third input terminal of each AND gate is connected to one of the output terminals Q and Q' of the D-flip-flop 4. A monostable multivibrator 6 is provided to be triggered upon falling of the oscillation output of the low frequency oscillator 2, and generates a one-shot pulse of a pulse width determined by a time constant of a resistor R4 and a capacitor C3. AND gates 7a and 7b are connected at their first input terminals to an inverting output terminal Q' of the monostable multivibrator 6. A comparator 8 comprising a general-use integrated circuit (for example, Model No. μPC 393 or the like manufactured by Nippon Electric Corporation, a Japanese manufacturer) is connected at its output end to a second input terminal of the AND gate 7a in positive logic and also to a second input terminal of the other AND gate 7b in negative logic. An operational amplifier 9 comprising also a general-use integrated circuit (for example, Model No. μPC 1251 or the like of Nippon Electric Corporation) is connected at its output end to a non-inverting input terminal (plus side terminal) of the comparator 8. A non-inverting input terminal (plus side terminal) of the operational amplifier 9 is connected through an input resistor R11 to a plus side output terminal D of a diode bridge DB and through a grounding resistor R21 to the ground, while an inverting input terminal (minus side terminal) of the operational amplifier 9 is connected through an input resistor R12 to a minus side output terminal C of the diode bridge DB and through a feedback resistor R22 to the output terminal of the operational amplifier 9. A control-type current source 10 comprising such current mirror circuit as shown in FIG. 8 is provided to charge the second capacitor C2 with a constant current determined by a resistor R5 in the circuit when an output of the AND gate 7a is turned to its high level. A further control-type current source 11 comprising such a current mirror circuit as shown in FIG. 9 is provided to discharge the second capacitor C2 with a constant current determined by a resistor R6 in this circuit when an output of the other AND gate 7b is turned to its high level. A constant current source 12 comprising such a current mirror circuit as shown in FIG. 10 is provided to draw a constant current determined by a resistor R7 in the circuit from an output terminal of the operational amplifier 9. A further operational amplifier 13 comprising also a general-use integrated circuit (such as the model No. μPC 1251 or the like of Nippon Electric Corporation) and having an output terminal connected to an own inverting input terminal is so provided as to operate as a buffer circuit which provides at the output terminal a voltage applied to a non-inverting input terminal as it is.

Across the DC current source $V_{DC}$, a series circuit of such switching elements Q1 and Q2 as a power MOSFET and a further series circuit also of such switching elements Q3 and Q4 as the power MOSFET are connected in parallel to one another. Across conjunction points between the switching elements Q1 and Q2 and between the switching elements Q3 and Q4, a series circuit of an inductor L1, the first capacitor C1 and a further inductor L1a is connected, and a further series circuit of an inductor L2 and discharge lamp Z is connected across the first capacitor C1 in parallel thereto. Further across the first capacitor C1, the diode bridge DB is connected at its both AC input terminals, and a resistor R3 is connected between the minus side output terminal C of the diode bridge DB and plus-side output terminal of the DC power source $V_{DC}$.

Figure 11:
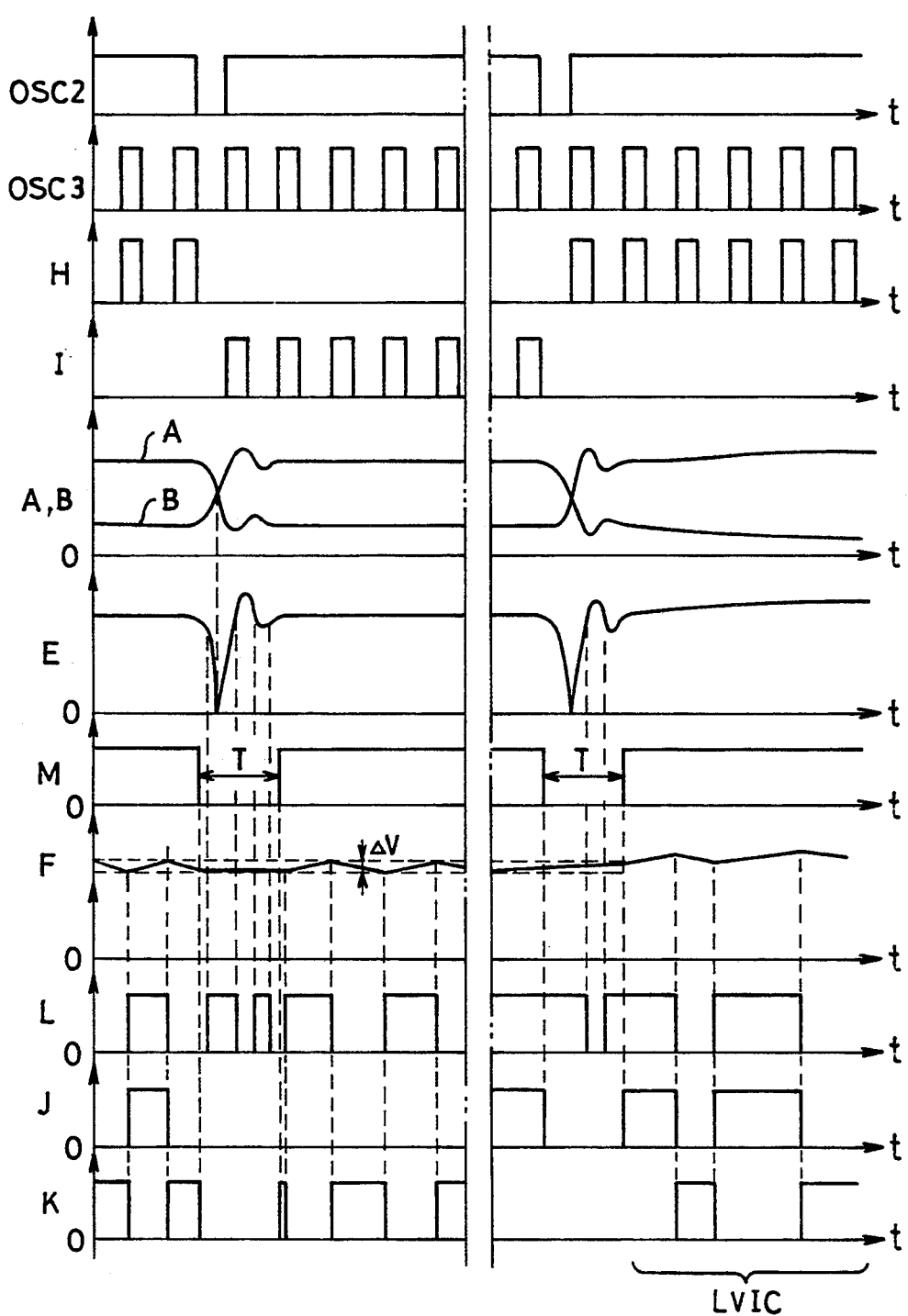
FIG. 11 shows in waveform diagrams the operation at respective parts in the embodiment of FIGS. 6 and 7.

In FIG. 11, there are shown operational waveforms in the embodiment of the inverter device shown in FIGS. 6 and 7, in which the waveforms A to M denote voltage waveforms at parts denoted by the same symbols in FIGS. 6 and 7. A waveform OSC2 is the oscillation output of the low frequency oscillator 2, and a waveform OSC3 is the oscillation output of the high frequency oscillator 3. A voltage ripple $\Delta V$ of the waveform F of the second capacitor C2 is caused to be varied by the precision or response speed of the comparator 8, operating speed of the logic circuits and a current value of the charging and discharging circuit. Potentials of the waveforms A and B at both ends of the first capacitor C1 will be, except upon inversion of the square wave polarity, $(V_{DC}+|V_{ab}|)/2$ for one of them and $(V_{DC}-|V_{ab}|)/2$ for the other, and the diode bridge DB allows the higher one of the potentials to be obtained at the plus side terminal D and the lower potential at the minus side terminal C. These potentials at these points C and D are subjected to a differential amplification at a differential amplifier circuit comprising the operational amplifier 9 and resistors R11, R12, R21 and R22, and their differential voltage Ve is obtained at the amplifier output point E. The circuit is so designed that R11=R12 and R21=R22, and the differential voltage Ve provided by the differential amplifier circuit is given by following equations:

$$Ve = (R21/R11)\{(V_{DC} + |V_{ab}|)/2 - (V_{DC} - |V_{ab}|)/2\}$$
$$= (R21/R11)|V_{ab}|$$

In this manner, it is possible to obtain a voltage corresponding to the lamp voltage. The differential amplifier is of a gain (R21/R11) which is less than 1 and is thus constituting an attenuation circuit. Here, the foregoing resistor R3 acts to bias minus-output side diodes into normal direction, to be contributive to a current supply to the resistors R12 and R22, and to satisfy such relationship as R3<R12+R22. Further, the constant current source 12 is such unilateral source as to be of a voltage $V_{cc}$ or "0" V in the source of the operational amplifier 9, and so functions that the potential at the E point will be lowered substantially to "0" V. This shows a tendency that, as the output of the operational amplifier of such unilateral source absorbs any current, the output is not decreased substantially to be "0" V, and is particularly useful in an event when it is necessary that a current fed back from the input side of the operational amplifier 9 through the feedback resistor R22 to the E point is absorbed into the output of the operational amplifier 9. For the current value of the constant current source 12, the value is so set as to be larger than the largest value of the current I2 fedback through feedback resistor R22 to the E point.

Figure 12:
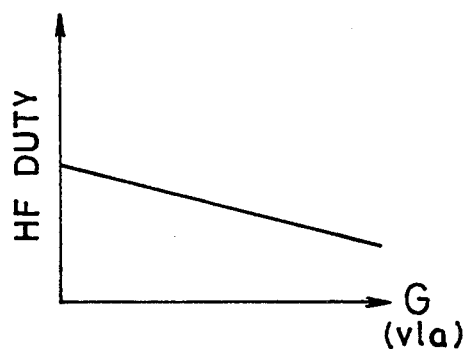
FIG. 12 is a characteristic diagram of a pulse width modulator (PWM) in the embodiment shown in FIGS. 6 and 7.

Next, the comparator 8 compares the potential at the E point with a potential at a point F from the second capacitor C2. When the F point potential is lower than the E point potential, that is, the potential of the capacitor C2 is lower, the control-type current source 10 is actuated to inject a charge into the capacitor C2. When on the other hand the F point potential is higher than the E point potential, the other control-type current source 11 is actuated to lead the charge out of the capacitor C2. In this event, the operation denoted by a waveform M in FIG. 11 is prohibited for a fixed time T in synchronism with the inverting timing of the square wave by means of a one-shot pulse signal prepared by the monostable multivibrator 6 in synchronism with the oscillation output of the low frequency oscillator 2, during which a voltage immediately before the inverting timing of the square wave is retained in the capacitor C2. With this operation, the voltage corresponding to the lamp voltage is provided as an output through the "buffer" amplifier circuit 13. In the present embodiment, further, the output of the circuit 13 is fed back to a pulse-width modulation (PWM) circuit 26 inserted between the high frequency oscillator 3 and the AND gates 5a and 5b and having such HF duty-to-gain ($V_{1a}$) characteristics as shown in FIG. 12, so that the duty of the high frequency oscillator 3 will be modulated in accordance with $V_{1a}$. In the waveform K of FIG. 11, "LVIC" denotes a rising time of the lamp voltage.

Figure 13:
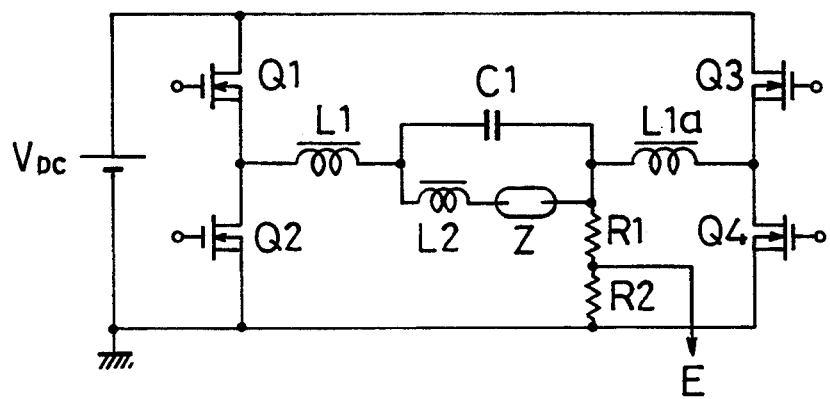
FIGS. 13 and 14 are circuit diagrams of different parts of another embodiment of the inverter device according to the present invention.
Figure 14:
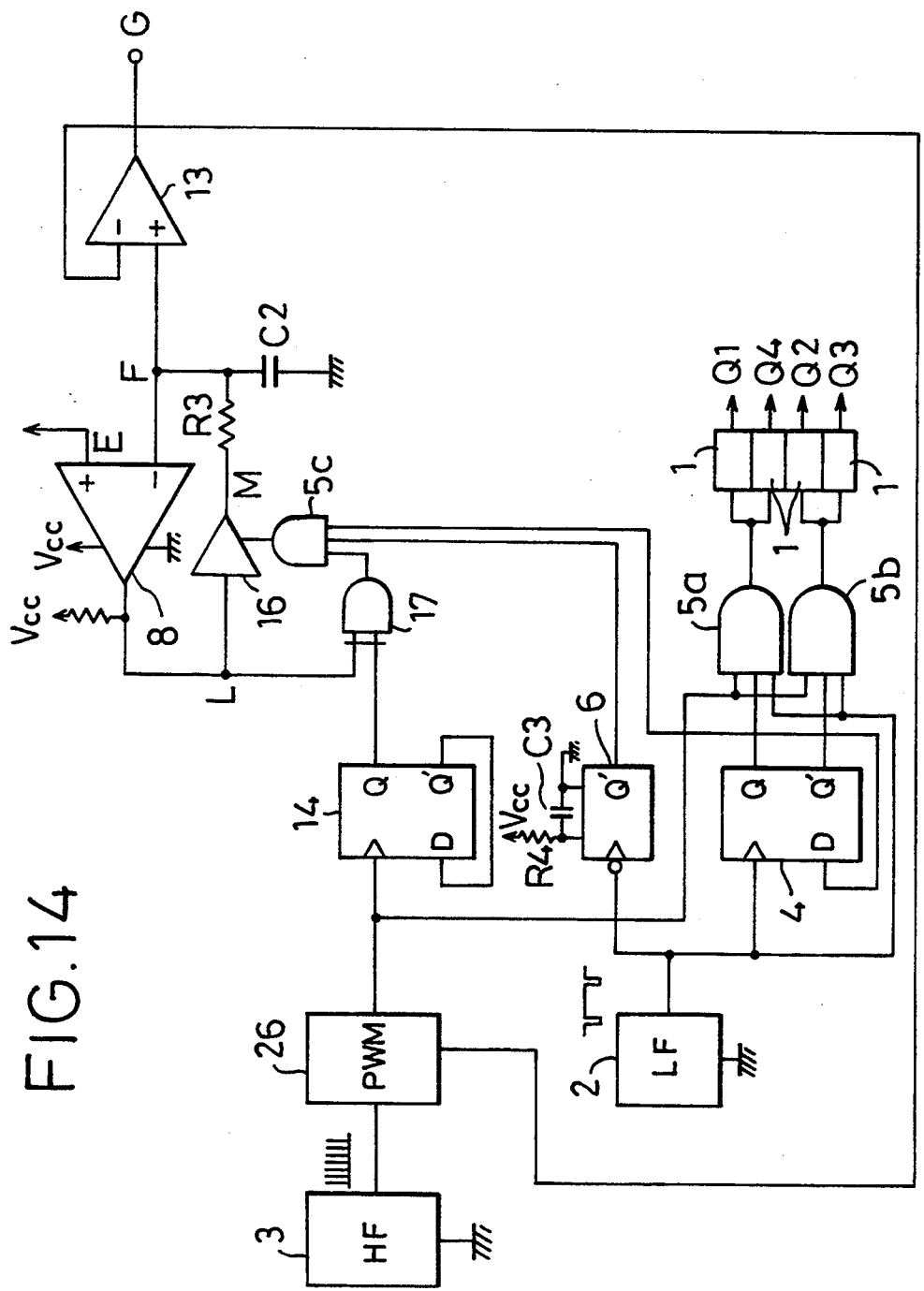

In FIGS. 13 and 14, there is shown another embodiment of the inverter device according to the present invention, in which the arrangement is so made that a voltage at one end of the first capacitor C1 is voltage-divided by resistors R1 and R2 for the comparison at the comparator 8 with the voltage at the second capacitor C2. In the present instance, a tristate buffer 16 is employed for a simplification of the circuit for charging and discharging the second capacitor C2, and the resistor R3 in FIG. 6 is employed also as a resistor for both of the charging and discharging. Here, the output of the comparator 8 is input into the tristate buffer 16 and an terminal of an exclusive AND gate 17, to the other input terminal of which gate 17 a frequency-divided output of a further D-flip-flop 14 is being input. An output of the exclusive AND gate 17 is provided as an input to a further AND gate 5c along with the inverting output Q' of the D-flip-flop 4 which frequency-dividing the oscillation output of the low frequency oscillator 2 as well as the inverting output Q' of the monostable multivibrator 6 triggered by the oscillation output of the low frequency oscillator 2, and an output of this AND gate 5c is utilized as a control signal for the tristate buffer 16. Here, the output of the tristate buffer 16 is in a high impedance state when the output of the AND gate 5c is at its low level, and is made to be identical to the input when the output of the AND gate 5c is at high level. That is, when the output of the comparator 8 is at high level, the output of the tristate buffer 16 is also made high level, and the capacitor C2 is thereby charged through the resistor R3, while the output at low level of the comparator 8 causes the output of the tristate buffer 16 also to be low level so that the capacitor C2 will be discharged through the resistor R3. The exclusive AND gate 17 provides a high level output when the inputs are all at high level or all at low level.

Figure 15:
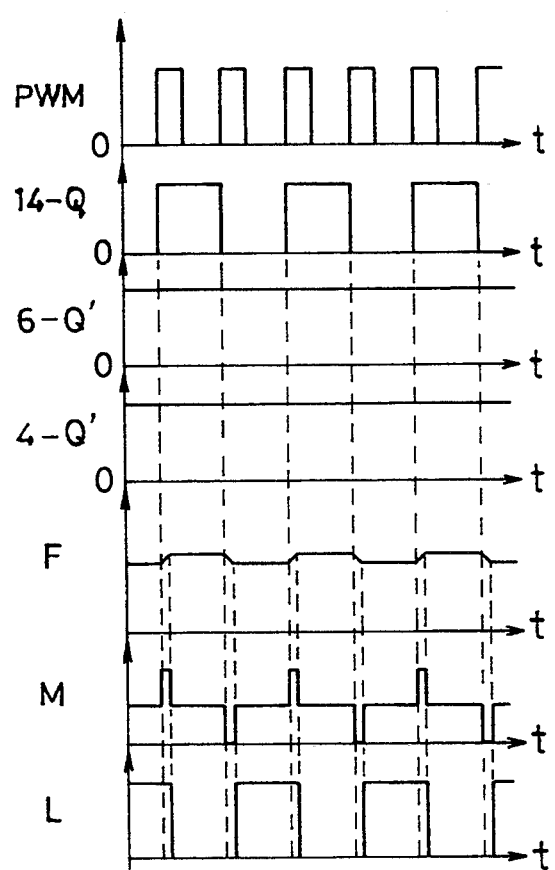
FIG. 15 shows in waveform diagrams the operation at respective parts in the embodiment of FIGS. 13 and 14.

In FIG. 15, there are shown operational waveforms of the embodiment of FIGS. 13 and 14, in which the waveforms represented by symbols F, M and L are of voltage waveforms at parts denoted by the same symbols in the circuit of FIG. 14. Further, a waveform 14-Q is of the output of the D-flip-flop 14, a waveform PWM is of the output of the PWM 26, a waveform 4-Q' is of the inverting output Q' of the D-flip-flop 4, and a waveform 6-Q' is of the inverting output Q' of the monostable multivibrator 6. A basic operation of this embodiment of FIGS. 13 and 14 is substantially the same as that of the embodiment of FIGS. 6 and 7, while in the present embodiment there is a distinction therefrom in respect that an arrangement for employing the potential only at one end of the first capacitor C1. In the present instance, the charging and discharging of the second capacitor C2 are executed only when the output voltage of $(E+|V_{ab}|)/2$ is provided across the resistors R1 and R2, and only half waves of the square wave are to be detected.

Other constituents of the embodiment shown in FIGS. 13 and 14 are the same as those in the foregoing embodiment of FIGS. 6 and 7, and the same elements as those employed in FIGS. 6 and 7 are denoted in FIGS. 13 and 14 by the same reference numerals employed in FIGS. 6 and 7.

Figure 16:
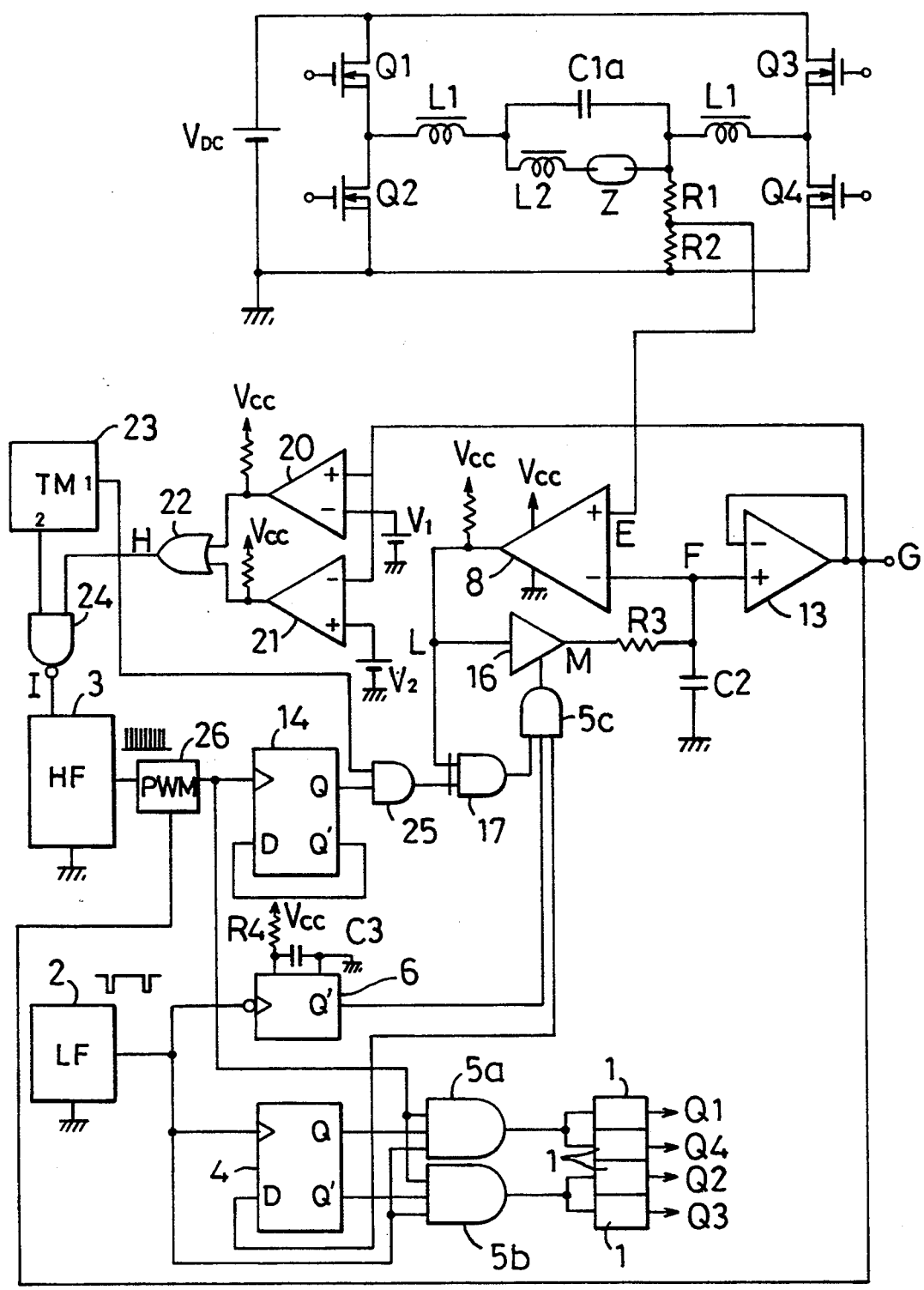
FIG. 16 shows in a circuit diagram still another embodiment of the inverter device according to the present invention.

In FIG. 16, there is shown another embodiment of the present invention, which comprises the arrangement of the embodiment of FIGS. 13 and 14 with a distinctive arrangement added. That is, in the present embodiment, too, the arrangement for comparing the voltage at one end of the capacitor C1 and voltage-divided at the resistors R1 and R2 with the voltage of the capacitor C2 by means of the comparator 8 is employed, together with the tristate buffer 16 for simplifying the charging and discharging circuit for the capacitor C2 and with the resistor R3 also employed as the resistor for the charging and discharging. In the present embodiment, on the other hand, a timer 23 having two output terminals TM1 and TM2 is provided so that, upon passing of a fixed time after connection of the inverter device to the DC power source, one output at the terminal TM1 is turned to high level and, upon passing of a further fixed time t1, the other output at the terminal TM2 is turned to high level (see also FIG. 17). Further, the one output of the timer 23 is input to an AND gate 25 together with an output frequency, and an output of this AND gate 25 is provided to the other input terminal of the exclusive AND gate 17, while the other output TM2 of the timer 23 is provided to an input terminal of a NAND gate 24.

Figure 17:
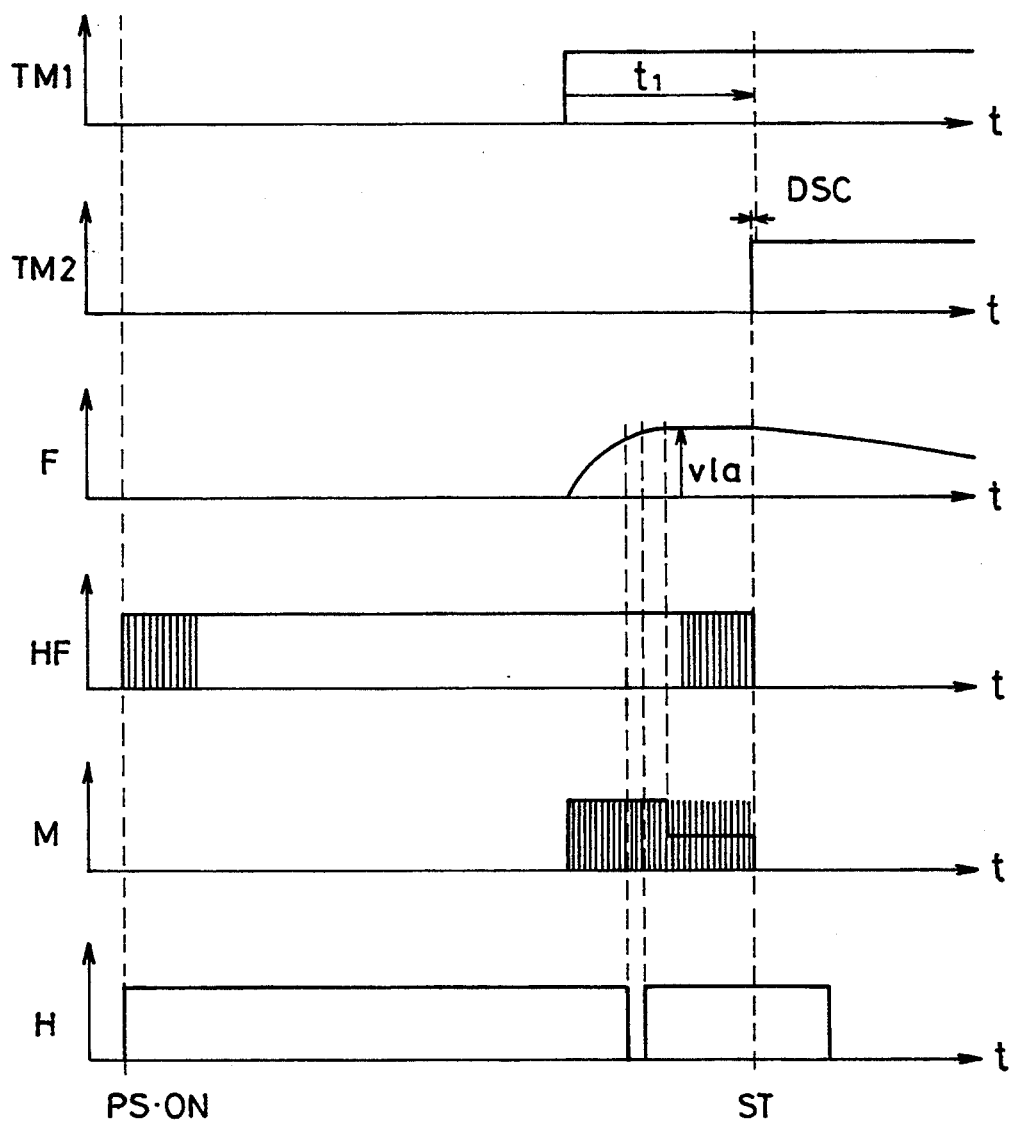
FIG. 17 shows in waveform diagrams the operation of the embodiment shown in FIG. 16.
Figure 18:
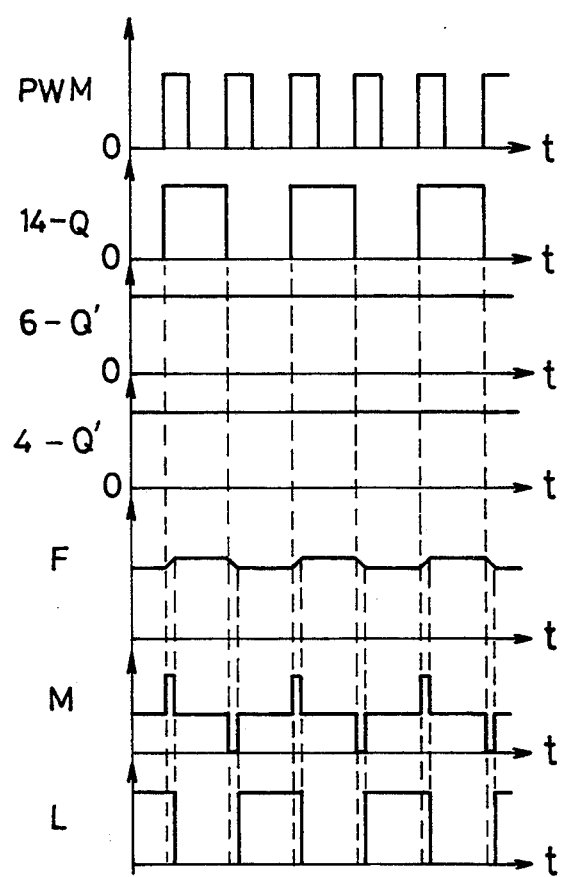
FIG. 18 shows in waveform diagrams the operation at respective parts in the embodiment of FIG. 16.

Further, a detected voltage $V_{1a}$ of the load given by the buffer amplifier 13 is provided to non-inverting and inverting terminals of both of a pair of comparators 20 and 21 to be compared respectively with voltages $V_1$ and $V_2$ which are corresponding to upper and lower limits of the load voltage $V_{1a}$ during stabilized lighting of the lamp, so that, provided that the load voltage $V_{1a}$ deviates from a range defined by these upper and lower limit voltages, a discrimination is made to be an abnormal state (very likely due to the life, slow leak or the like of the load when the same is HID lamp, for example) and a high level output is generated by the comparators to cause the operation of the high frequency oscillator 3 to be stopped through the NAND gate 24. Accordingly, in the present instance, the detecting operation of the load voltage $V_{1a}$ is carried out such that, only when one high level output TM1 of the timer 23 is provided through the AND gate 25, the charging and discharging operation with respect to the capacitor C2 is carried out, whereas, when the other timer output TM2 is at high level, the discrimination of abnormality or normality is to be made. That is, the charging and discharging operation of the second capacitor C2 is to be executed only during a predetermined period except for the time when the square wave polarity is inverted after passing of a certain fixed time from the connection of the power source to the inverter device. In FIGS. 17 and 18, there are shown voltage waveforms at parts denoted in the circuit of FIG. 16, wherein a notation PS·ON in FIG. 17 denotes the timing of the power source connection, a notation ST is the timing of stopping the charging and discharging operation, and a notation DSC is a period in which the foregoing discrimination of the abnormality or normality is to be made.

Other constituents in the embodiment of FIG. 16 are the same as those in the foregoing embodiments of FIGS. 6 and 7 and FIGS. 13 and 14 as will be clear when the waveforms of FIGS. 15 and 18 are compared with one another, and the same elements of FIG. 16 as those in FIGS. 6 and 7 and in FIGS. 13 and 14 are denoted by the same references as those used in the latter drawings.

Figure 19:
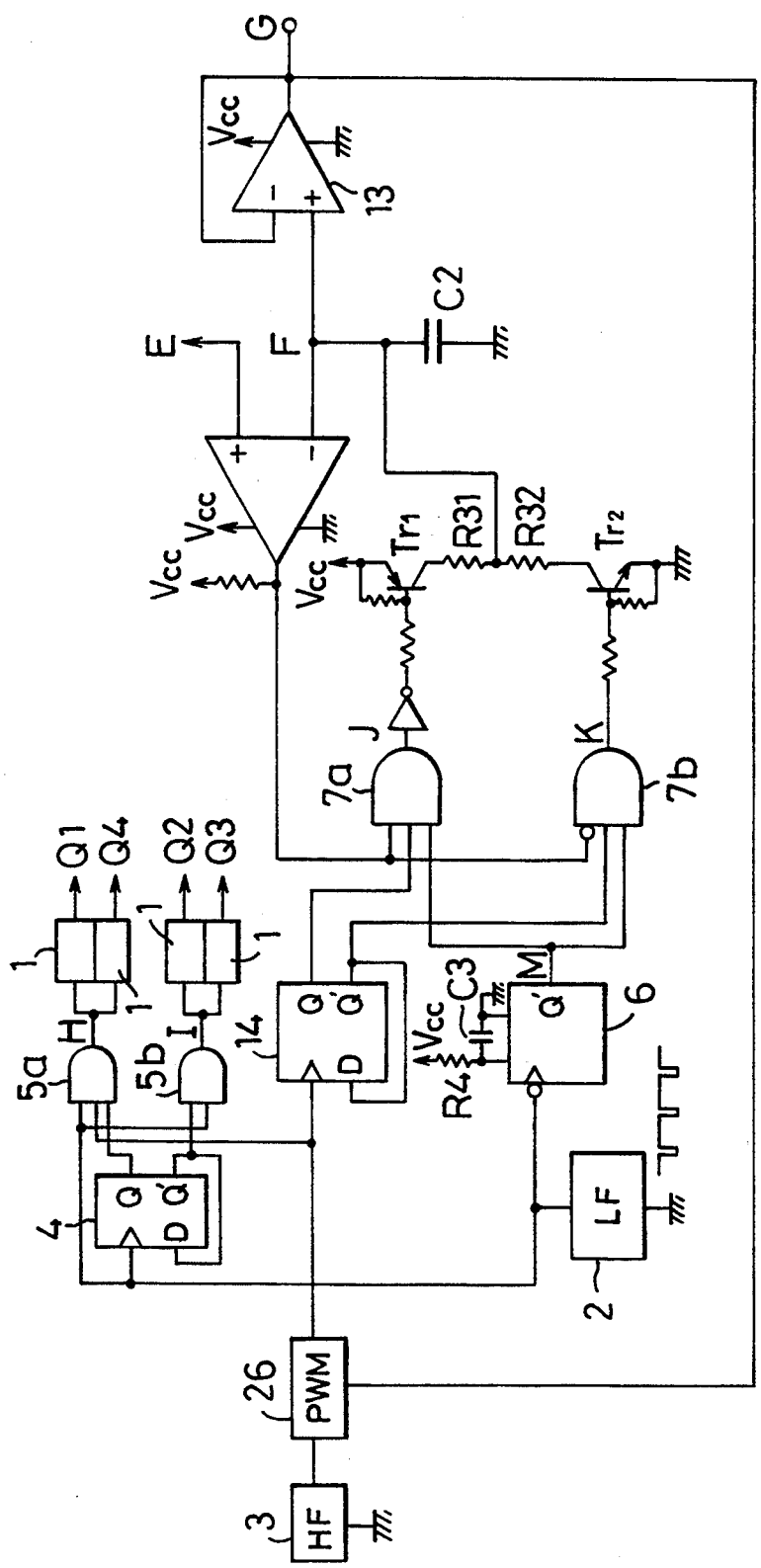
FIG. 19 is a circuit diagram showing a further embodiment of the inverter device according to the present invention.

In FIG. 19, there is shown a further embodiment of the present invention, in which the oscillation output of the high frequency oscillator 3 is frequency-divided at the D-flip-flop 14, and thereby frequency-divided outputs are provided as inputs to the AND gates 7a and 7b. An output of the AND gate 7a is provided as a control signal to a charging circuit for the second capacitor C2 and comprising a NOT circuit 15, transistor Tr1 and charging resistor R31, while an output of the other AND gate 7b is provided as a control signal to a discharging circuit for the second capacitor C2 and comprising a transistor Tr2 and its discharging resistor R32.

Figure 20:
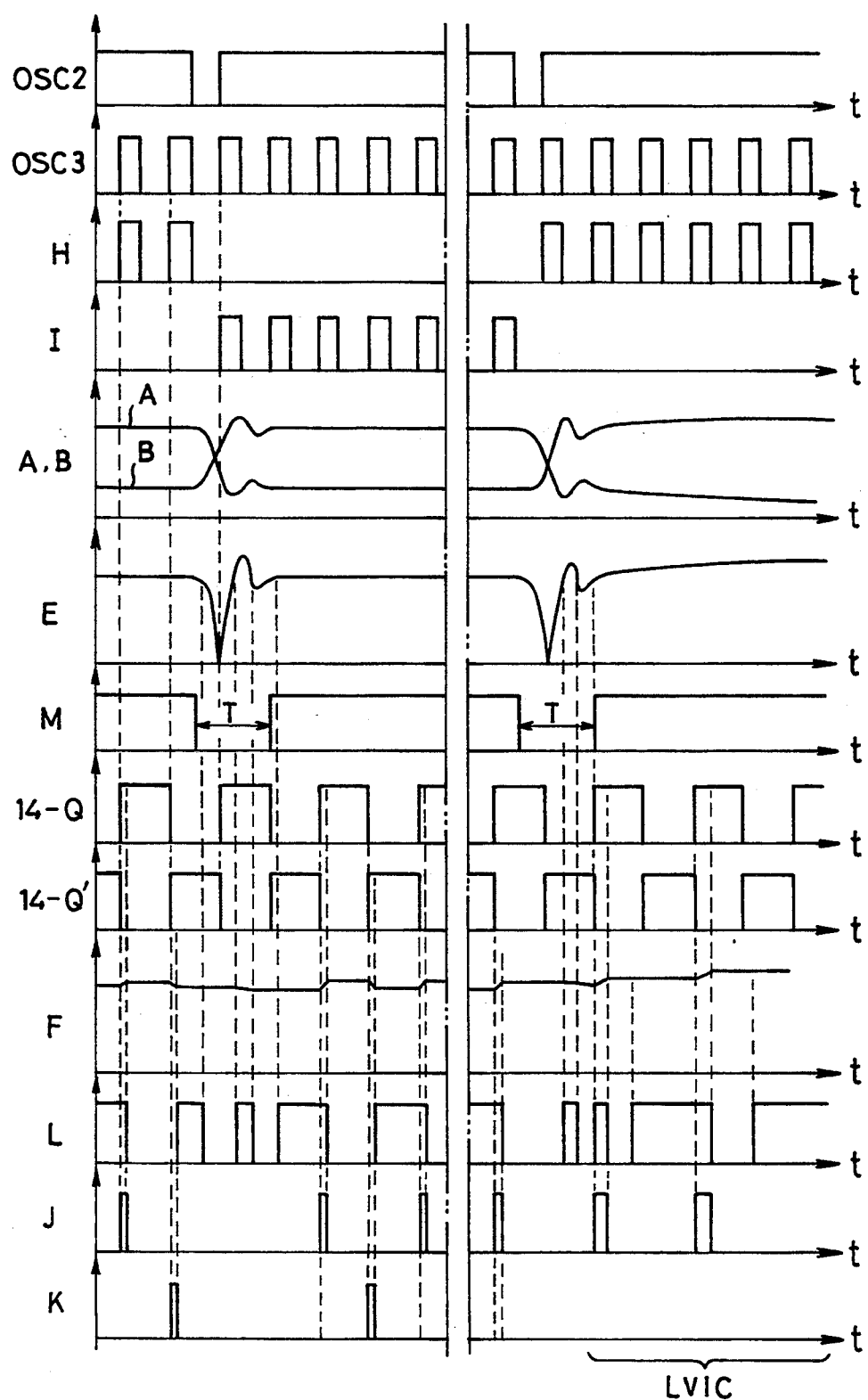
FIG. 20 shows in waveform diagrams the operation at respective parts in the embodiment of FIG. 19.

In FIG. 20, operational waveforms in the embodiment of FIG. 19 are shown, in which the waveforms presented by symbols H to K are of respective voltages at parts in FIG. 19 denoted by the same symbols, the one presented by OSC2 is of the oscillation output of the low frequency oscillator 2, the one denoted by OSC3 is of the oscillation output of the high frequency oscillator 3, the one denoted by 14-Q is of a Q output of the D-flip-flop 14, and the one presented by 14-Q' is of an inverted Q output of the D-flip-flop 14. In the present instance, in particular, the charging and discharging timing of the second capacitor C2 is so set as to be in synchronism with switching timing of the switching elements Q1 to Q4. That is, the output of the D-flip-flop 14 for frequency-dividing the output of the high frequency oscillator 3 is inverted upon every high-frequency switching of the switching elements Q1–Q4, so that the charging operation of the second capacitor C2 will be performed only when the output Q is at high level, while the discharging operation of the second capacitor C2 will be performed only when the inverted output Q' is at high level. In consequence thereof, the frequency on which the charging and discharging operation for the second capacitor C2 is based is made to be identical to switching frequency of the respective switching elements Q1–Q4, so as to be particularly advantageous as a measure for noise elimination and to render the noise elimination by means of a filter to be easier since the ripple voltage of the output is made constant in the frequency.

Other constituents in the embodiment of FIG. 19 are the same as those employed in the foregoing embodiments and, in FIG. 19, the same elements as those employed in the embodiments of FIGS. 6 and 7, FIGS. 13 and 14 and FIG. 16 are denoted by the same references used in these drawings.

Figure 21:
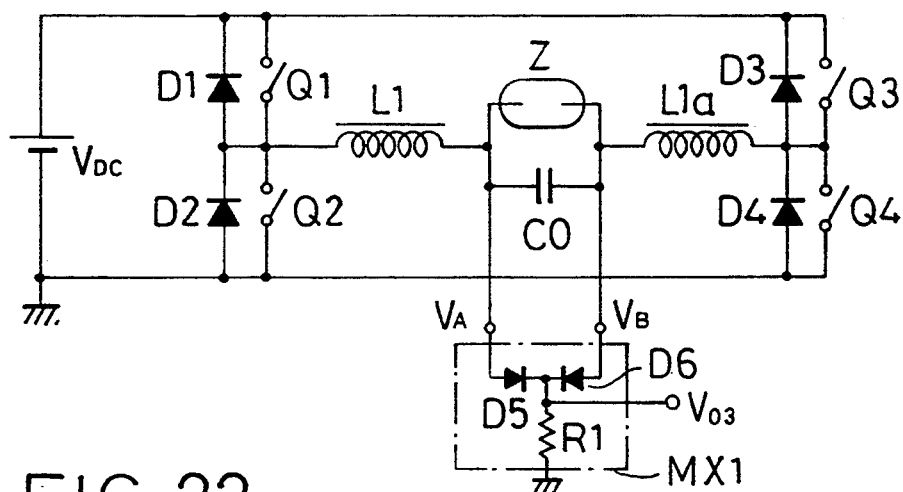
FIG. 21 shows in a circuit diagram still another embodiment of the inverter device according to the present invention.

In FIG. 21, there is shown still another embodiment of the present invention, in which the discharge lamp Z as a load is connected at one end through the first inductor L1 to a junction point between the first and second switching elements Q1 and Q2 and at the other end through the second inductor L1a to another junction point between the third and fourth switching elements Q3 and Q4 while these two inductors L1 and L1a are so set as to be substantially equal to each other in the inductance value. Further, both end potentials $V_A$ and $V_B$ of the discharge lamp Z are detected at the maximum value detecting circuit MX1 comprising diodes D5 and D6 and resistor R1, and the maximum value of these potentials $V_A$ and $V_B$ is provided as an output voltage $V_{O3}$. In the present instance, the provision at both ends of the discharge lamp Z of the first and second inductors L1 and L1a of the substantially equal inductance value eliminates any fluctuation in the both end potentials $V_A$ and $V_B$ of the discharge lamp Z due to the high frequency switching of the first to fourth switching elements Q1 to Q4, whereby any integrating circuit for controlling the detected voltage fluctuation is made unnecessary, and any delay in the maximum value detection due to integrating operation can be restrained. Consequently, the lamp voltage of the discharge lamp Z can be detected at a high speed in a high precision, ON and OFF control of the first to fourth switching elements Q1 to Q4 can be attained in accordance with any change in the operation state of the discharge lamp Z, and eventually any fluctuation in the lamp voltage, lamp current and so on can be restrained.

Figure 25:
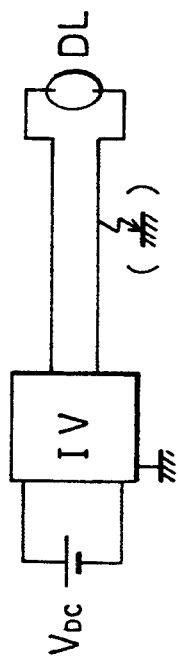

Further, since the arrangement for the voltage detection employs only the maximum value detecting circuit MX1 comprising the diode D5 and D6 and resistor R1, the load voltage detection can be effectively accomplished by the extremely simpler circuit. Further, even in an event when an earthing accident has occurred in two wire line between the discharge lamp Z and the inverter IV comprising the first to fourth switching elements Q1 to Q4 as seen in FIG. 25, the insertion of the inductors L1 and L1a on both sides of the lamp is effective to carry out a current limitation at the inductors L1 and L1a, and the switching elements Q1 to Q4 can be prevented from being damaged.

Figure 22:
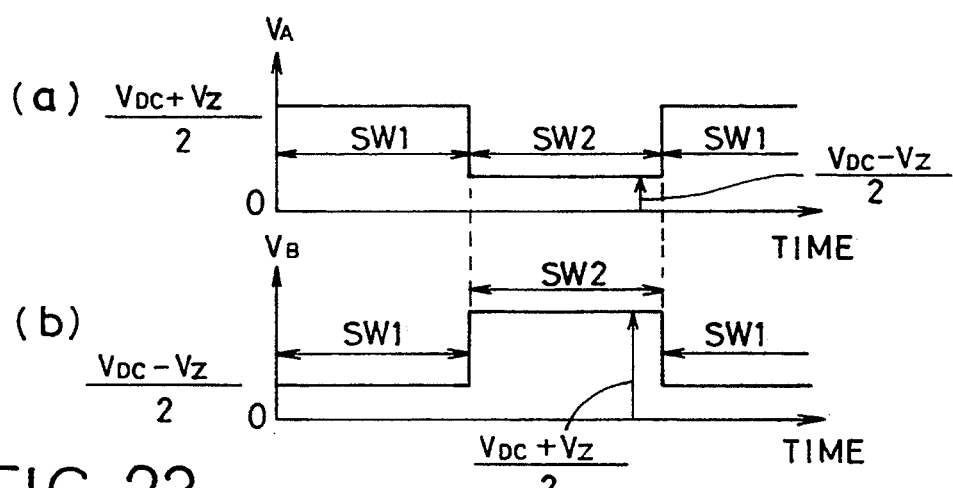
FIGS. 22 to 25 are diagrams for explaining the operation of the embodiment shown in FIG. 21.
Figure 23:
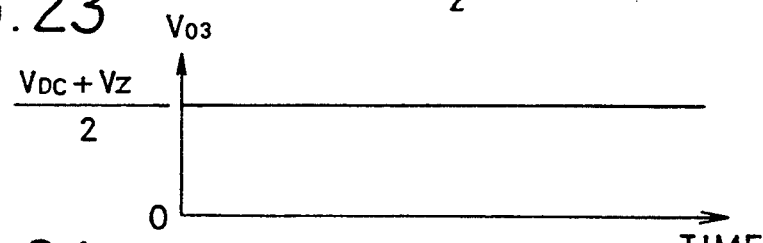
Figure 24:
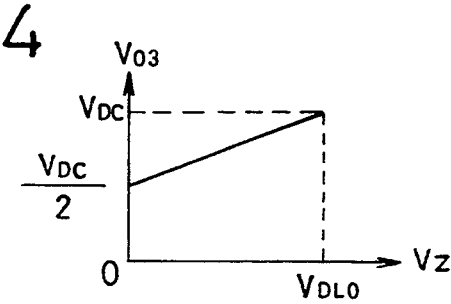

In waveforms (a) and (b) of FIG. 22, there are shown input and output voltages of the maximum value detecting circuit MX1 in the present embodiment, in which (a) is of the potential $V_A$ and (b) is of the potential $V_B$. In FIG. 23, a waveform of the output voltage $V_{O3}$ is shown. As will be clear from these drawings, the potential $V_A$ will be $(V_{DC}+V_Z)/2$ in high level period SW1 and $(V_{DC}-V_Z)/2$ in low-level period SW2, whereas the other potential $V_B$ will be $(V_{DC}-V_Z)/2$ in the low-level period SW1 and $(V_{DC}+V_Z)/2$ in the high level period SW2. Consequently, the maximum value detecting circuit MX1 is to provide as its output the maximum value of both potentials $V_A$ and $V_B$, which will be always $(V_{DC}+V_Z)/2$. In FIG. 24, further, there is shown characteristics representing variation in the voltage $V_{O3}$ in response to variation in the lamp voltage $V_{DL}$, in which $V_{DLO}$ represents an open-load voltage.

It will be appreciated that other constituents of the embodiment in FIG. 21 may be the same as those employed in the foregoing embodiments.

Figure 26:
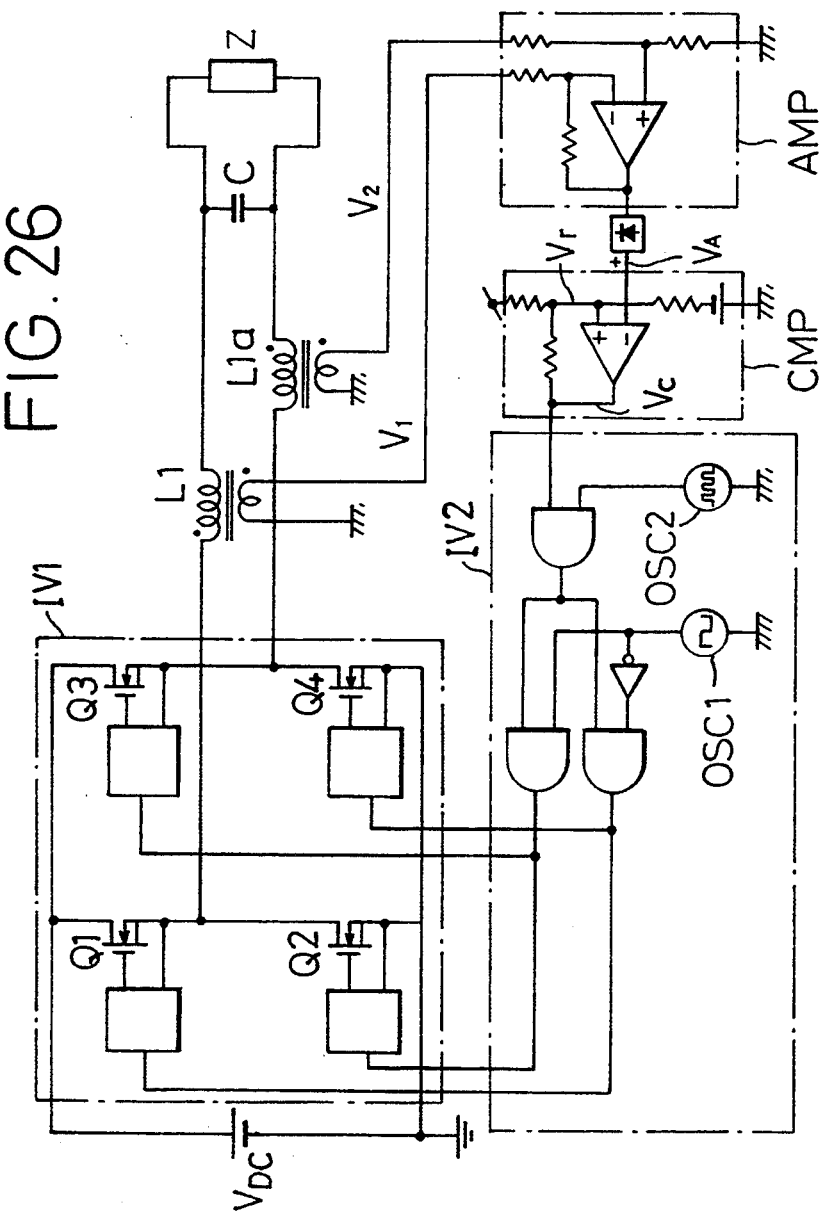
FIGS. 26 to 29 show in circuit diagrams other embodiments of the inverter device according to the present invention.

In FIG. 26, there is shown still another embodiment of the present invention, in which the inductors L1 and L1a of the substantially equal inductance value are disposed at both ends of the load Z. These inductors L1 and L1a are respectively provided with each of secondary windings which are connected to a differential amplifier AMP and a comparator CMP having a retaining function so that generated voltages in the windings will be thereby monitored. Here, the arrangement is so made that the switching operation of the device will be stopped whenever a voltage difference exceeding a predetermined value is detected. That is, when either one of both ends of the load is grounded, for example, there arises a difference in the generated voltages in the inductors L1 and L1a, the output of the differential amplifier AMP is no more zero, the operation of the inverters IV1 and IV2 forming the main parts of the inverter device is thereby caused to stop, and the constituents, in particular, the switching elements of the device can be effectively prevented from being damaged.

All other constituents of the embodiment shown in FIG. 26 may be substantially equal to or similar to those employed in the foregoing embodiments.

Figure 27:
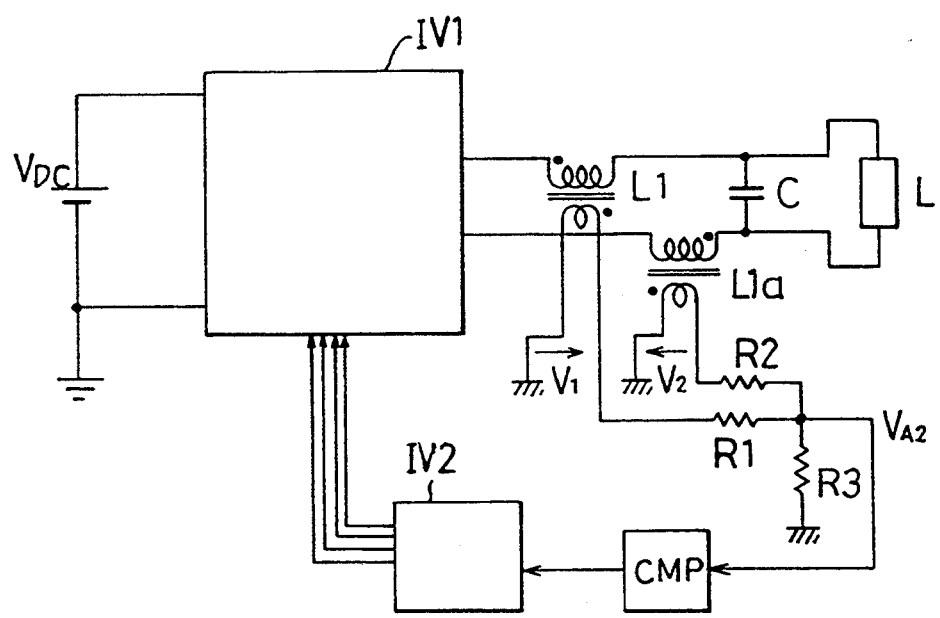

In a further embodiment shown in FIG. 27 of the present invention, resistors R1, R2 and R3 are connected with respect to the first and second inductors L1 and L1a, so that any difference between the generated voltages in the secondary windings provided to the inductors L1 and L1a can be easily detected.

All other constituents in the embodiment of FIG. 27 are the same as those employed in the embodiment of FIG. 26, and their arrangement may be substantially equal to or similar to those in the foregoing embodiments, as in the embodiment of FIG. 26.

Figure 28:
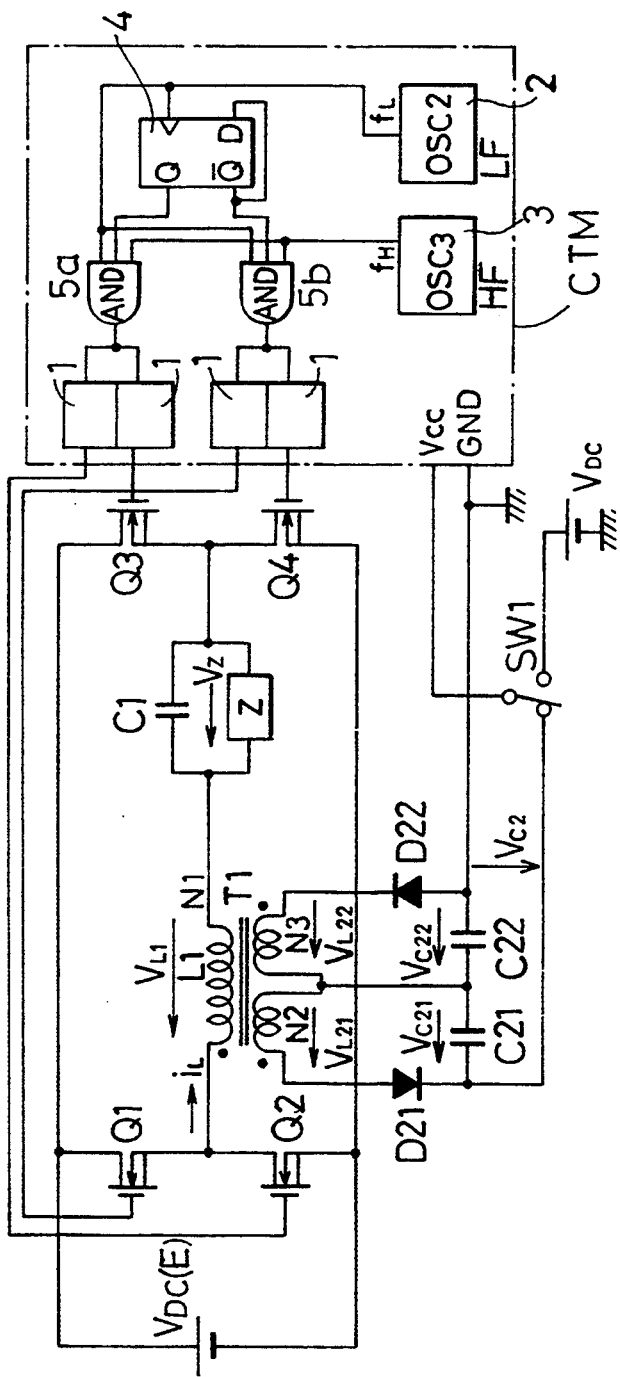
Figure 30:
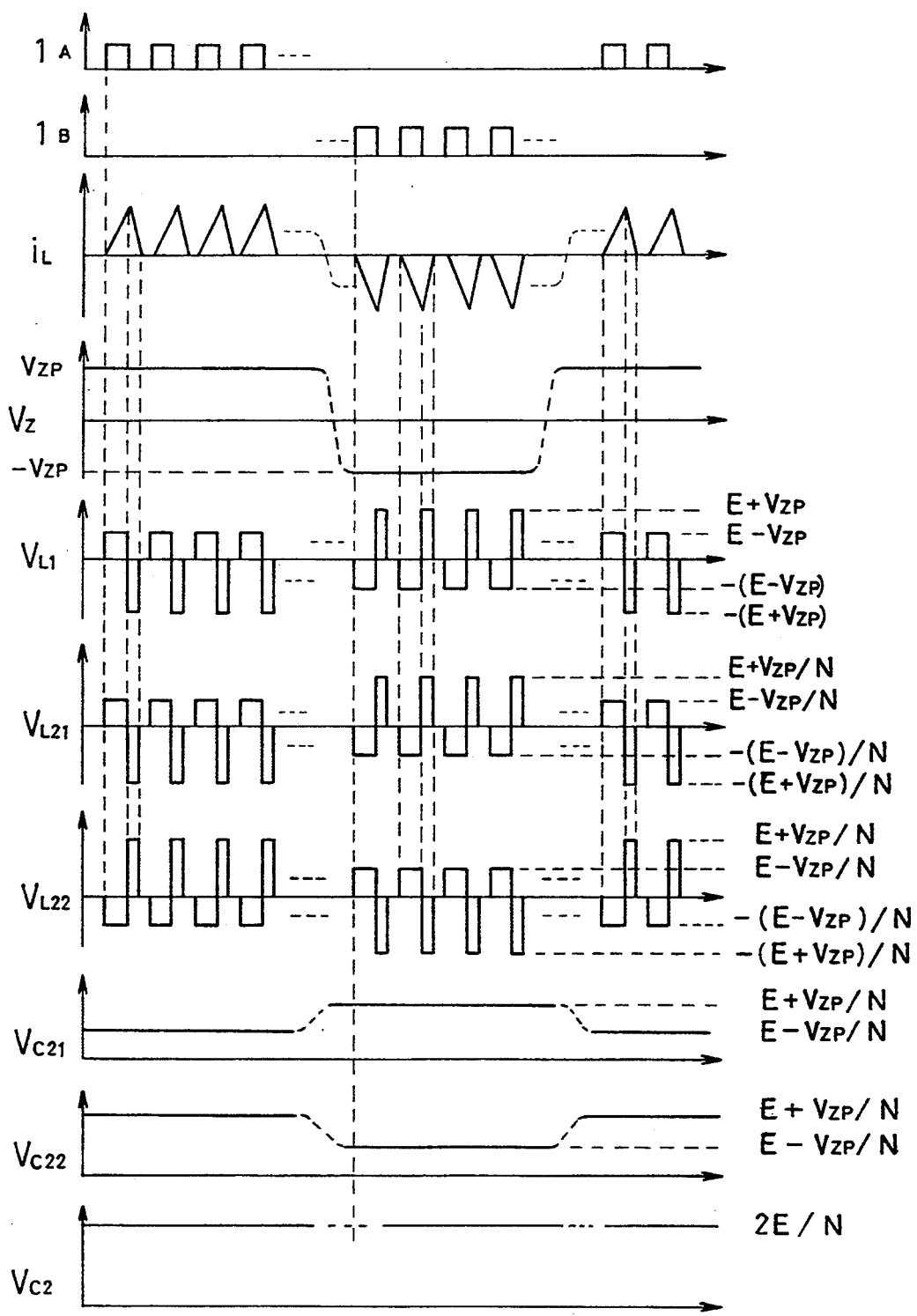
FIG. 30 shows in waveform diagrams the operation at respective parts in the embodiment of FIG. 28.

In another embodiment shown in FIG. 28, there is provided a transformer T1 including a primary winding N1 and two secondary windings N2 and N3, and diodes D21 and D22 and capacitors C21 and C22 are connected to these two secondary windings for carrying out mutually reverse directional half-wave rectification, whereby voltages $V_{L21}$ and $V_{L22}$ generated at the secondary windings N2 and N3 are half-wave rectified reverse directionally to be stabilized, and a voltage $V_{C2}$ proportional in high precision to the power source voltage $V_{DC}(E)$ is thereby obtained (see also waveforms in FIG. 30). That is, the voltage $V_{C2}$ will be $2V_{DC}/N[N=(N1/N2)]$ which is well in proportional to the source voltage, and the voltage can be employed as a stable source power of the control circuit without being influenced by the operating state of the load or by the low frequency oscillator 2 in the control means CTM.

Figure 29:
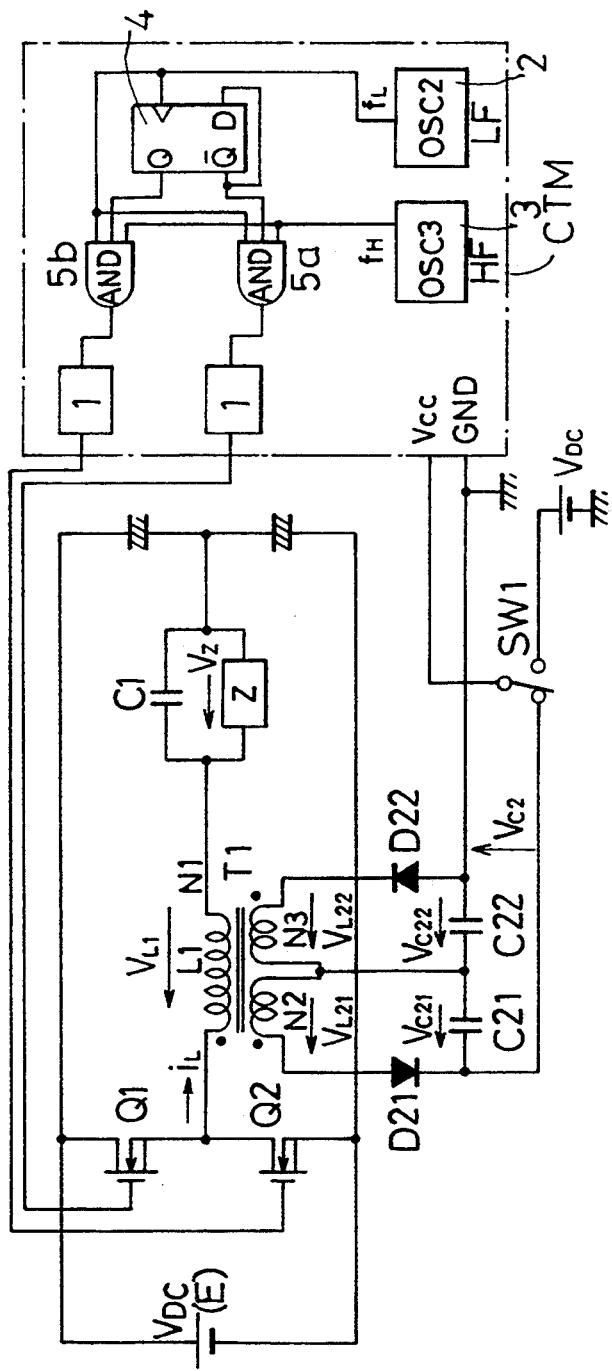

In FIG. 30, there are shown operational waveforms in the embodiment of FIG. 28, in which the waveforms represented by voltage symbols are of voltage waveforms respectively at parts in the circuit of FIG. 28 denoted by the same symbols. It is also possible to employ such half-bridge circuit having only two switching elements Q1 and Q2 as shown in FIG. 29, for attaining the same operation as in the embodiment of FIG. 28. Other arrangements in the embodiments of FIGS. 28 and 29 may be substantially the same as or similar to those in the foregoing embodiments.

Figure 31:
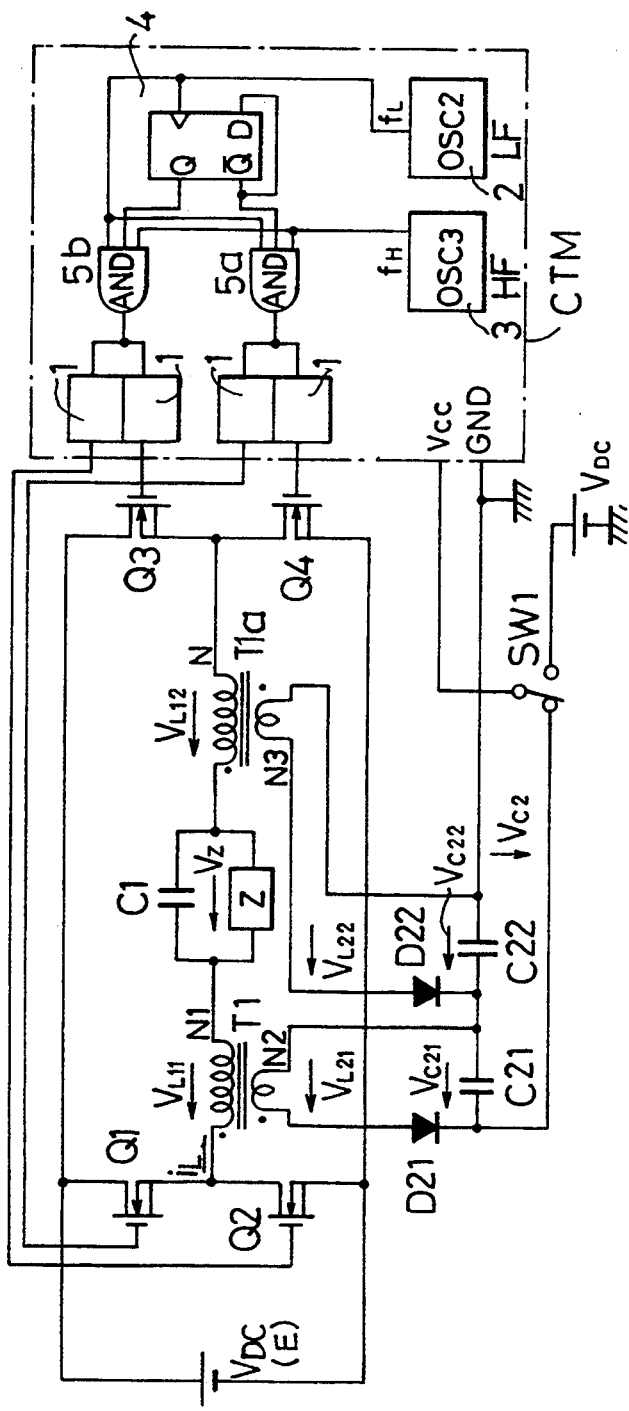
FIG. 31 is a circuit diagram showing another embodiment of the inverter device according to the present invention.
Figure 32:
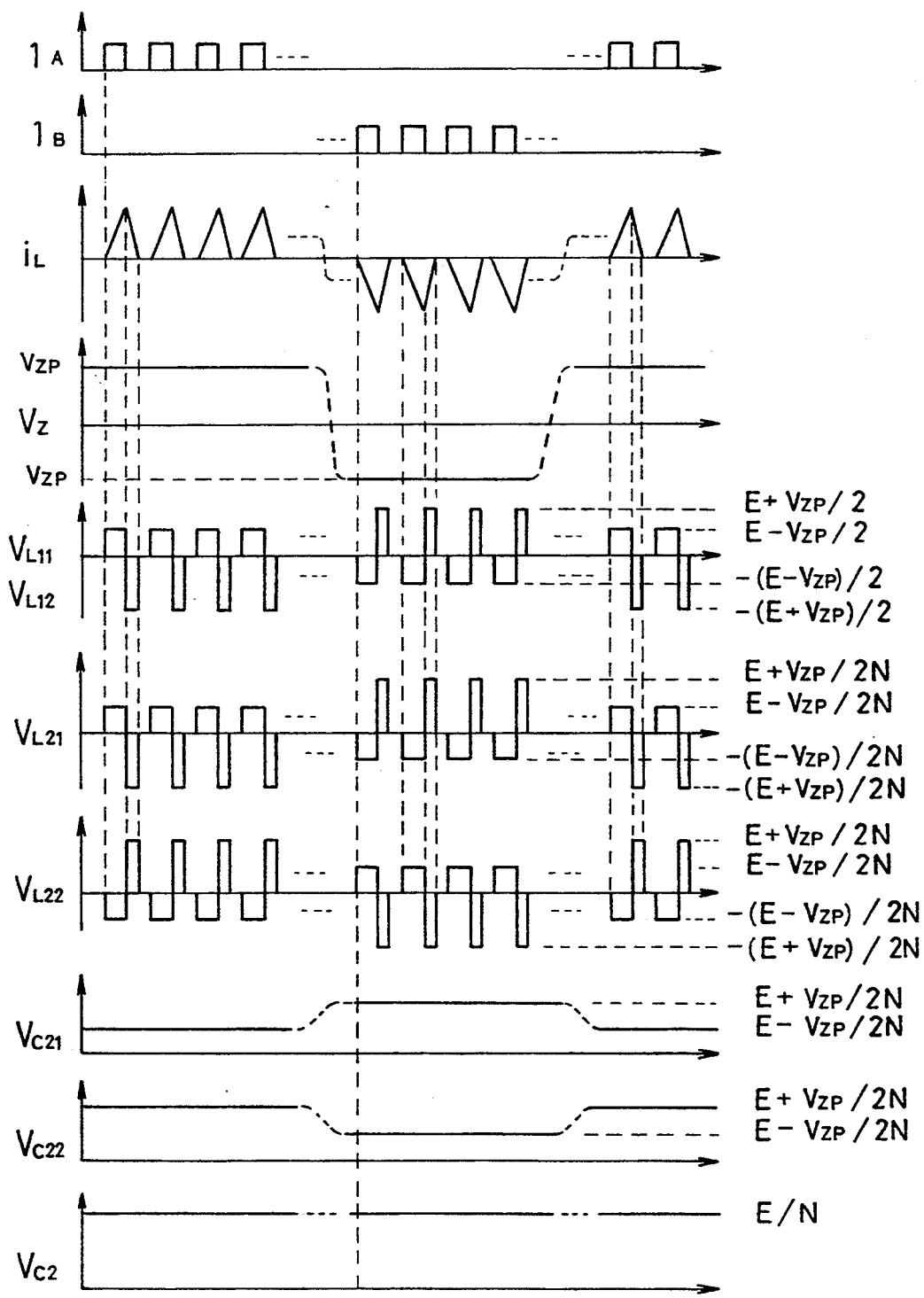
FIG. 32 shows in waveform diagrams the operation at respective parts in the embodiment of FIG. 31.

In another embodiment shown in FIG. 31, transformers T1 and T1a each having a single secondary winding N2 or N3 with respect to the primary winding N1 or N1a are connected to both ends of the load Z, while the diodes D21 and D22 and capacitors C21 and C22 are connected to these secondary windings N2 and N3 for carrying out the mutually reverse directional half-wave rectification. As will be clear when waveforms in FIG. 32 of respective parts in the circuit of FIG. 31 are also referred to, the voltages $V_{L21}$ and $V_{L22}$ generated at the secondary windings N2 and N3 are half-wave rectified in reverse direction and are stabilized. In FIG. 32, the waveforms represented by voltage symbols are of the voltages at parts in the circuit of FIG. 31 denoted by the same symbols. All other arrangements in the embodiment of FIG. 31 may be substantially the same as or similar to those shown in the foregoing embodiments.

Figure 33:
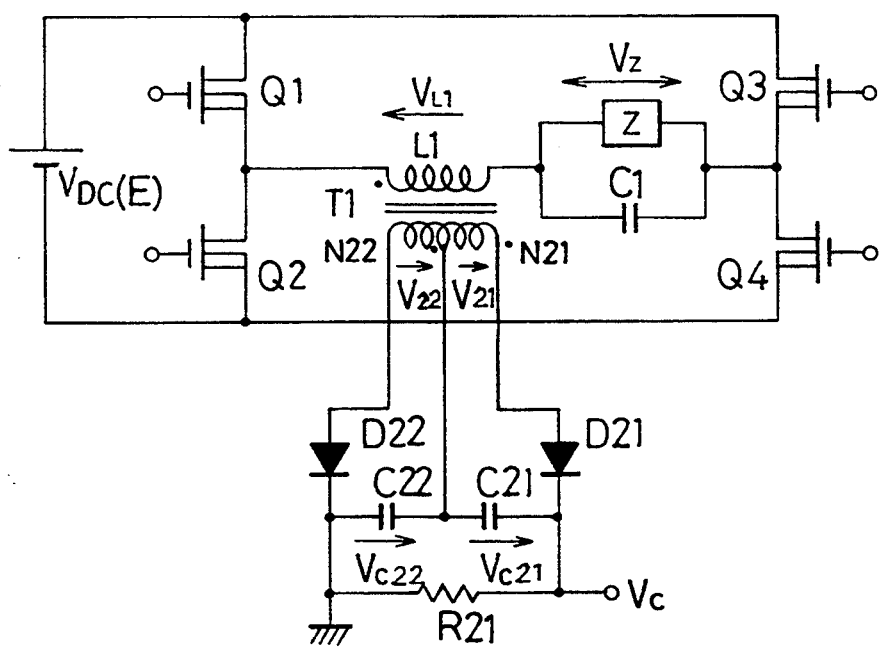
FIG. 33 is a circuit diagram showing another embodiment of the inverter device according to the present invention.
Figure 34:
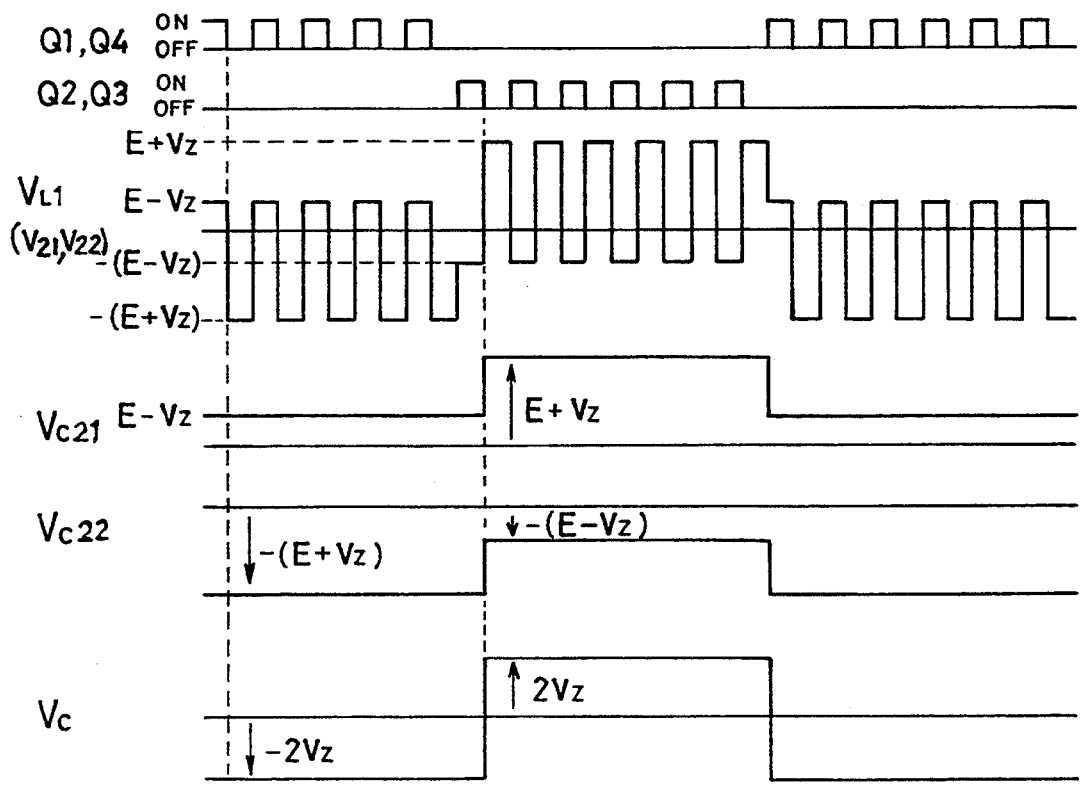
FIG. 34 shows in waveform diagrams the operation at respective parts in the embodiment of FIG. 33.

In a further embodiment of the present invention as shown in FIG. 33, the polarity of the secondary winding N21 of the transformer T1 and of the diode D21 is made different from that in FIG. 28, and an additional resistor R21 of a time constant lower than the high frequency but higher than the low frequency is connected in parallel to a series circuit of the capacitors C21 and C22, whereby, as will be clear when FIG. 34 is concurrently referred to, it is made possible to detect the load voltage $V_Z$ with an improved response to the variation in operating state of the load, without any influence of the source voltage $V_{DC}(E)$ and due to that the time constant is not larger than $1/f_L$. In FIG. 34, further, the waveforms represented by voltage symbols are of the voltages at parts in the circuit of FIG. 33 denoted by the same symbols. Other arrangements in the embodiment of FIG. 33 may be substantially the same as or similar to those in the embodiment of FIG. 28 or in the foregoing embodiments.

Figure 35:
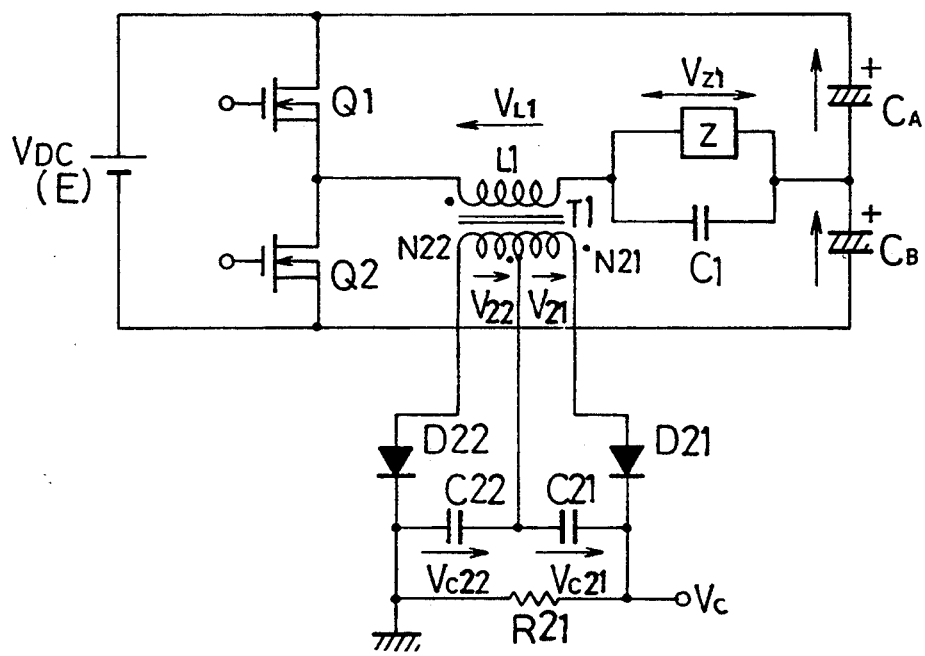
FIG. 35 is a circuit diagram showing another embodiment of the inverter device according to the present invention.
Figure 36:
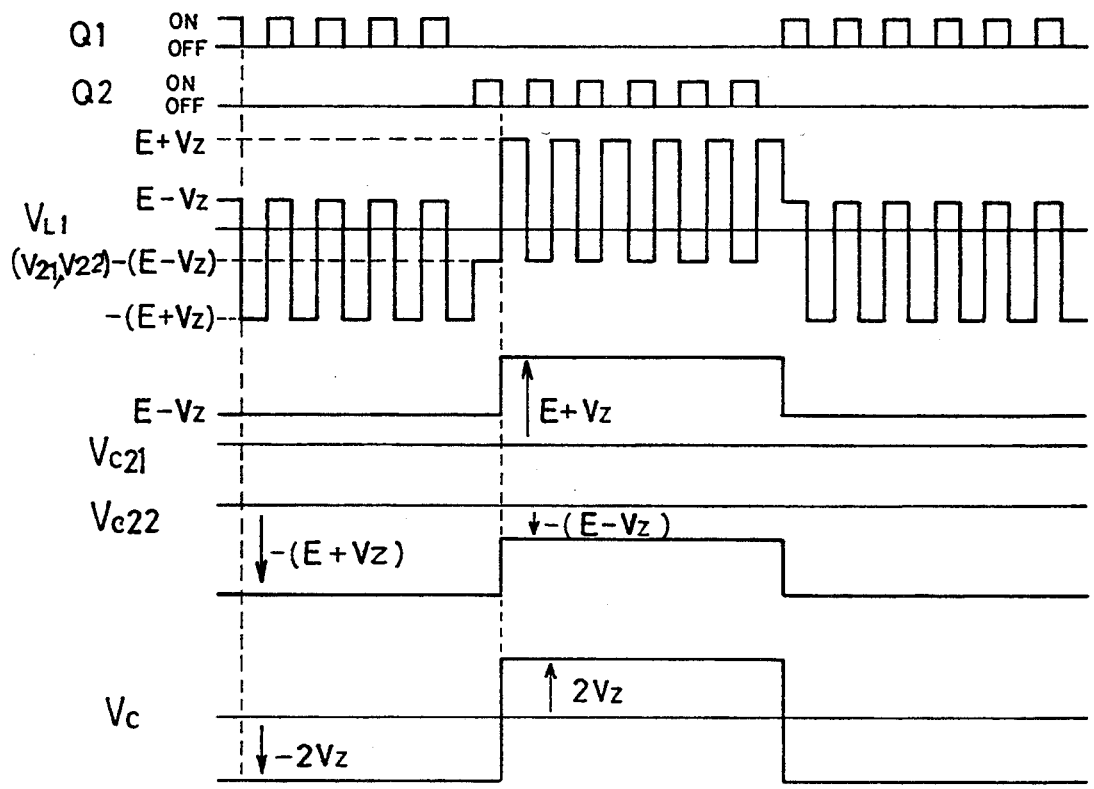
FIG. 36 shows in waveform diagrams the operation at respective parts in the embodiment of FIG. 35.

Still another embodiment of the present invention shown in FIG. 35 employs a half-bridge having only two switching elements Q1 and Q2 in contrast to the embodiment of FIG. 33. In the present instance, substantially the same operation as that in the embodiment of FIG. 33 can be attained, as will be clear when voltage waveforms of FIG. 36 are also referred to. In FIG. 36, the waveforms represented by voltage symbols are of the voltages at parts in the circuit of FIG. 35 denoted by the same symbols. Other arrangements in the embodiment of FIG. 35 can be substantially the same as or similar to those in the embodiment of FIG. 33 or in any one of the foregoing embodiments.

Figure 37:
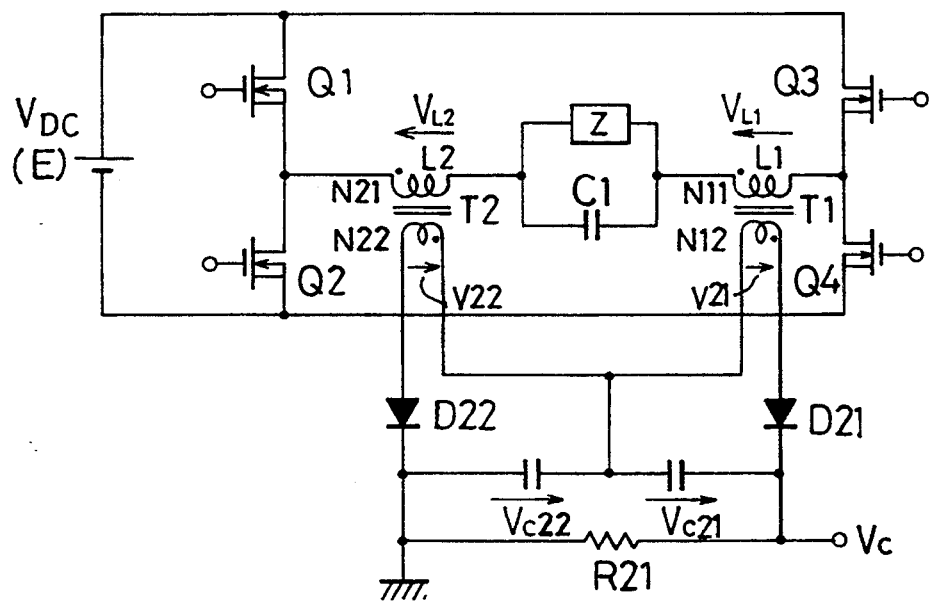
FIG. 37 is a circuit diagram showing another embodiment of the inverter device according to the present invention.
Figure 38:
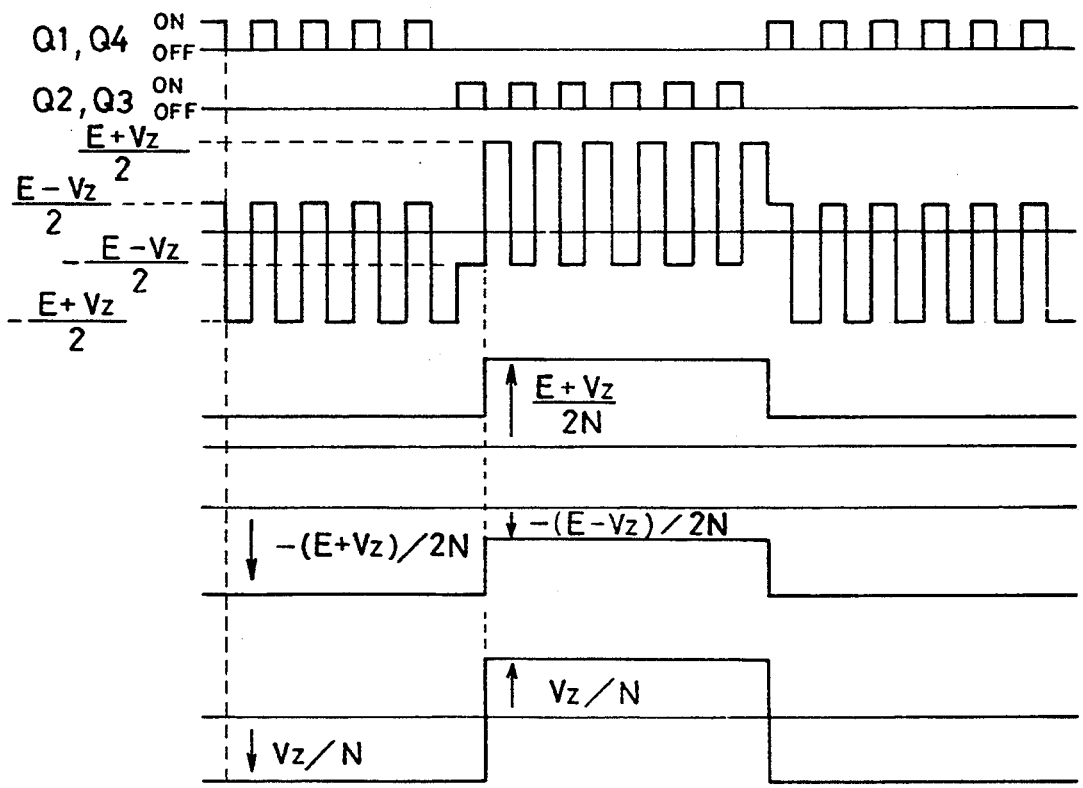
FIG. 38 shows in waveform diagrams the operation at respective parts in the embodiment of FIG. 37.

In another embodiment shown in FIG. 37 of the present invention, the polarity of the transformer and the direction of the diode are made different from those in the embodiment of FIG. 31, and the additional resistor R21 of the time constant lower than the high frequency but higher than the low frequency is connected in parallel to the series circuit of the capacitors C21 and C22. In the present instance, it is possible to attain the same operation as in the embodiment of FIG. 33 as will be clear when FIG. 38 is also referred to. In FIG. 38, waveforms represented by voltage symbols are of the voltages attained at parts denoted in FIG. 37 by the same symbols. Other arrangements in the embodiment of FIG. 37 may be substantially the same as or similar to those shown in the embodiment of FIG. 31 or in any one of the foregoing embodiments.

Figure 39:
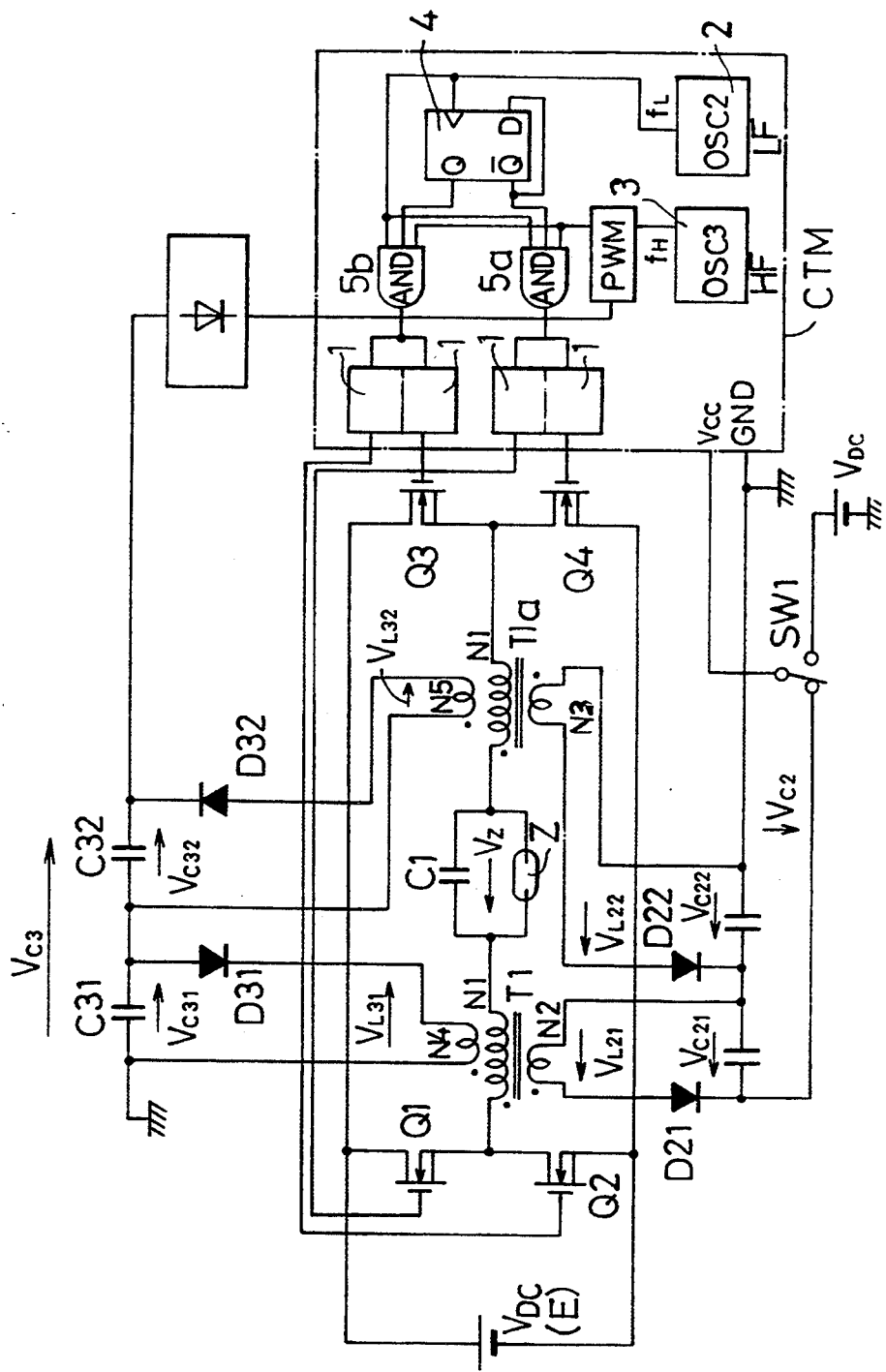
FIG. 39 is a circuit diagram showing another embodiment of the inverter device according to the present invention.
Figure 40:
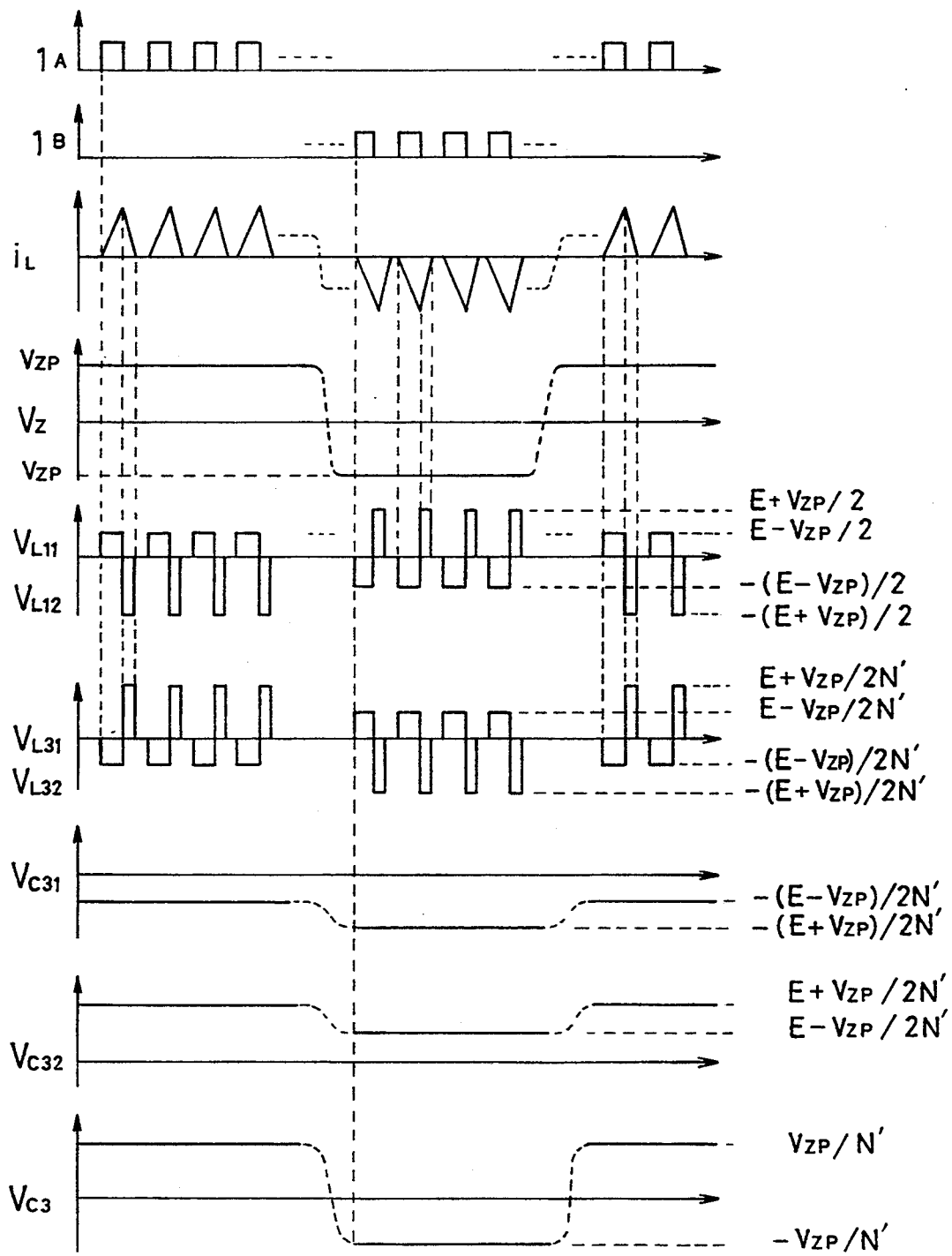
FIG. 40 shows in waveform diagrams the operation at respective parts in the embodiment of FIG. 39.

In still another embodiment shown in FIG. 39 of the present invention, the arrangements in the embodiments of FIGS. 31 and 37 are combined. According to the present embodiment, it is made possible to carry out the load voltage detection and to provide a stable source power to the control circuit. In FIG. 40, waveforms represented by voltage symbols are of the voltages attained at parts denoted in FIG. 39 by the same symbols. Other arrangements in the embodiment of FIG. 39 may be substantially the same as or similar to those shown in the embodiment of FIG. 31 or in any one of the foregoing embodiments.

What is claimed is:

1. An inverter device having a load voltage detecting function, said inverter device comprising:
    switching means connected to a DC power source for producing a square wave voltage from DC power produced by the DC power source;
    a load section connected to said switching means and including at least a load and a first capacitor connected in parallel with said load;
    voltage detecting means connected to said load section for generating a detection voltage responsive to the square wave voltage applied to said load, said voltage detecting means including a second capacitor and means for comparing the detection voltage with a voltage on said second capacitor;
    charging and discharging means for charging said second capacitor with the detection voltage when the detection voltage is higher than a voltage on said second capacitor and discharging said second capacitor when the detection voltage is lower than the voltage on said second capacitor; and
    means for maintaining, during application to said load of a transient voltage upon every inversion of the square wave voltage, the voltage on said second capacitor immediately before the inversion.

2. The device of claim 1 wherein said voltage detecting means is provided for obtaining said detection voltage of said load at least at one of both ends of said load section.

3. The device of claim 1 wherein said voltage detecting means is provided for obtaining said detection voltage of said load upon every half wave in one of its both polarities.

4. The device of claim 1 wherein said voltage detecting means is provided for obtaining said detection voltage of said load for all waves by detecting the load voltage in every half cycle.

5. The device of claim 1 wherein said voltage detecting means is provided for obtaining said detection voltage of said load in an optional half cycle.

6. The device of claim 1 wherein said load section includes an impedance element connected in series to said load.

7. The device of claim 1 wherein said charging and discharging means is synchronized with actuation of said switching means.

8. The device of claim 1 wherein said means for maintaining maintains the voltage on said second capacitor for a time corresponding to inversion of the voltage applied to said load when no detection voltage is output by said voltage detecting means.

9. The device of claim 2 wherein said voltage detecting means includes inductance means coupled to one end of said load section.

10. The device of claim 2 wherein said voltage detecting means includes inductance means connected to parallel to said load section.

11. The device of claim 10 wherein said inductance means includes a pair of inductors respectively including secondary windings, said secondary windings providing substantially mutually identical outputs.

12. The device of claim 10 wherein said voltage detecting means includes a differential amplifier receiving the detection voltage through said inductance means.

13. The device of claim 10 wherein said inductance means comprises a pair of inductors respectively including secondary windings for producing an envelope voltage when one of said secondary windings has a positive direction output and the other of said secondary windings has a negative direction output.

14. The device of claim 11 wherein said voltage detecting means includes means for mutually reversely half-wave rectifying the outputs of said secondary windings.

15. The device of claim 1 wherein said load is a high pressure discharge lamp.

16. An inverter device comprising:
   switching means connected to a DC power source for modulating DC power produced by the DC power source and producing a square wave having a variable frequency;
   a load section connected to said switching means and including at least a load and a first capacitor connected in parallel with said load;
   an inductor connected across said load;
   voltage detecting means for detecting a voltage on said load and generating an output in response; and
   means for controlling ON and OFF periods of said switching means in accordance with the output of said voltage detecting means.

* * * * *

UNITED STATES PATENT AND TRADEMARK OFFICE
CERTIFICATE OF CORRECTION

PATENT NO. : 5,365,150
DATED : November 15, 1994
INVENTOR(S) : SHIOMI et al.

It is certified that error appears in the above-indentified patent and that said Letters Patent is hereby corrected as shown below:

Column 13, line 19, change "to" to --in--.

Signed and Sealed this

Seventh Day of February, 1995

Attest:

BRUCE LEHMAN

Attesting Officer     Commissioner of Patents and Trademarks